United States Patent
Hinago et al.

(10) Patent No.: US 8,900,754 B2
(45) Date of Patent: *Dec. 2, 2014

(54) ELECTRODE, AND LITHIUM ION SECONDARY BATTERY, ELECTRIC DOUBLE LAYER CAPACITOR AND FUEL CELL USING THE SAME

(71) Applicant: Asahi Kasei Chemicals Corporation, Tokyo (JP)

(72) Inventors: Hidenori Hinago, Tokyo (JP); Masashi Ishikawa, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,296

(22) Filed: Jun. 17, 2013

(65) Prior Publication Data

US 2013/0295492 A1   Nov. 7, 2013

Related U.S. Application Data

(62) Division of application No. 12/593,587, filed as application No. PCT/JP2008/055958 on Mar. 27, 2008, now Pat. No. 8,486,565.

(30) Foreign Application Priority Data

Mar. 28, 2007 (JP) ................ 2007-083307
Mar. 28, 2007 (JP) ................ 2007-083309
Mar. 28, 2007 (JP) ................ 2007-083328

(51) Int. Cl.
*H01M 4/583* (2010.01)
*H01G 11/38* (2013.01)
(Continued)

(52) U.S. Cl.
CPC ........... *H01G 11/38* (2013.01); *H01G 9/016* (2013.01); *H01G 9/058* (2013.01); *H01G 11/44* (2013.01); *H01G 11/50* (2013.01); *H01G 11/86* (2013.01); *H01M 4/133* (2013.01); *H01M 4/587* (2013.01); *H01M 4/96* (2013.01); *H01M 10/0525* (2013.01); *H01G 11/34* (2013.01); *Y02E 60/122* (2013.01); *Y02E 60/13* (2013.01); *Y02E 60/50* (2013.01); *Y02T 10/7011* (2013.01); *Y02T 10/7022* (2013.01)
USPC ................................................. 429/231.4

(58) Field of Classification Search
USPC ............................................. 429/231.4, 231.8
See application file for complete search history.

(56) References Cited

U.S. PATENT DOCUMENTS 5,348,818 A * 9/1994 Asami et al. ............ 429/213
5,679,480 A   10/1997 Takahashi et al.

(Continued)

FOREIGN PATENT DOCUMENTS

CN   1910771 A   1/2005
CN   1905101 A   7/2006

(Continued)

OTHER PUBLICATIONS

Sato et al., "Large Scale Rechargeable Batteries for Vehicles," CMC Publishing Co., Ltd., 2003 (See partial English translation).

(Continued)

*Primary Examiner* — Patrick Ryan
*Assistant Examiner* — Lucas J O Donnell
(74) *Attorney, Agent, or Firm* — Morgan, Lewis & Bockius LLP

(57) ABSTRACT

The present invention provides an electrode comprising a carbon material obtained from an azulmic acid and a current collector and/or a binder.

18 Claims, 3 Drawing Sheets

(51) Int. Cl.
*H01G 9/008* (2006.01)
*H01G 9/04* (2006.01)
*H01G 11/44* (2013.01)
*H01G 11/50* (2013.01)
*H01G 11/86* (2013.01)
*H01M 4/133* (2010.01)
*H01M 4/587* (2010.01)
*H01M 4/96* (2006.01)
*H01M 10/0525* (2010.01)
*H01G 11/34* (2013.01)

(56) References Cited

U.S. PATENT DOCUMENTS

| | | | |
|---|---|---|---|
| 5,766,445 A * | 6/1998 | Hashizume et al. | 205/414 |
| 5,919,589 A * | 7/1999 | Kawakami et al. | 429/231.8 |
| 7,531,267 B2 | 5/2009 | Kim | |
| 8,034,976 B2 * | 10/2011 | Hinago et al. | 564/1 |
| 8,486,565 B2 * | 7/2013 | Hinago et al. | 429/231.4 |
| 2004/0241532 A1 * | 12/2004 | Kim | 429/44 |
| 2005/0281729 A1 | 12/2005 | Suzuki et al. | |
| 2007/0020385 A1 | 1/2007 | Naoi et al. | |
| 2007/0237990 A1 | 10/2007 | Kim | |
| 2009/0112020 A1 | 4/2009 | Hinago et al. | |

FOREIGN PATENT DOCUMENTS

| | | | | |
|---|---|---|---|---|
| JP | 63216272 A * | 9/1988 | | H01M 10/40 |
| JP | H07-037577 | 2/1995 | | |
| JP | H07-090588 A | 4/1995 | | |
| JP | H08-165111 A | 6/1996 | | |
| JP | H08-180866 A | 7/1996 | | |
| JP | H09-027317 A | 1/1997 | | |
| JP | H10-021918 A | 1/1998 | | |
| JP | 2000-001306 A | 1/2000 | | |
| JP | 2001-080914 A | 3/2001 | | |
| JP | 2003-137524 A | 5/2003 | | |
| JP | 2003-277026 A | 10/2003 | | |
| JP | 2004-168587 A | 6/2004 | | |
| JP | 2004-342463 A | 12/2004 | | |
| JP | 2004-362802 A | 12/2004 | | |
| JP | 2005-000798 A | 1/2005 | | |
| JP | 2005-089264 A | 4/2005 | | |
| JP | 2005239456 A | 9/2005 | | |
| JP | 2006-124250 A | 5/2006 | | |
| WO | 2004112174 | 12/2004 | | |
| WO | 2007043311 | 4/2007 | | |

OTHER PUBLICATIONS

Hatai et al., "Carbon Materials for Negative Electrodes for Lithium Ion Secondary Batteries," Realize Science & Engineering Center Co., Ltd., 1996, pp. 4 and 11 (See partial English translation).

Leon et al., "Carbon-Nitrogen Pyrolyzates: Attempted Preparation of Carbon Nitride," Journal of the American Ceramic Society, 74: 1686-1688 (1991).

Li et al., "Crystalline Carbon Nitride Deposited by Glow Discharge in Liquid Phase," Chemical Journal of Chinese Universities, 25: 21-23 (2004)(See English abstract).

Office Action issued in related Korean Patent Application No. 2008-7007523 dated Feb. 22, 2010.

Office Action issued in related Chinese Patent Application No. 200680035969.6 dated Jul. 14, 2010.

* cited by examiner

ELECTRODE, AND LITHIUM ION SECONDARY BATTERY, ELECTRIC DOUBLE LAYER CAPACITOR AND FUEL CELL USING THE SAME

TECHNICAL FIELD

The present invention relates to an electrode.

More particularly, the present invention relates to an electrode for a lithium ion secondary battery, an electrode for an electric double layer capacitor and an electrode for a fuel cell, and a lithium ion secondary battery, an electric double layer capacitor and a fuel cell which use the respective electrodes.

BACKGROUND ART

<Lithium Ion Secondary Battery>

Since a lithium ion secondary battery is lightweight and of a high capacity in comparison with a nickel-cadmium battery and a nickel metal hydride battery, it has been put to practical use, for example, as a power supply for driving portable electronic devices such as mobile telephones, notebook-sized personal computer, video camcorders and the like, and has accomplishes rapid growth. In addition to these applications, the lithium ion secondary battery has been recently also expected as a secondary battery to replace a nickel-cadmium battery and a nickel metal hydride battery or a lead storage battery used for a power supply of battery vehicles and hybrid type battery vehicles due to the characteristics that the lithium ion secondary battery is lightweight of a high capacity.

Representative electrode materials of the lithium ion secondary battery are graphite and non-graphitizable carbon materials.

The material currently used for the electrode of the lithium ion secondary battery is graphite. One of the characteristics of graphite is that it has a relatively high theoretical charge/discharge capacity as high as 372 mAh/g. However, this is also a problem that charge/discharge capacity exceeding this value cannot be obtained, which becomes an obstacle in attaining higher capacity. In addition to this, the lithium ion secondary battery comprising an electrode made from graphite has a problem that it has poor high rate characteristics and therefore it cannot be used for as a power supply of the hybrid type battery vehicles and battery vehicles. Therefore the present condition is that new materials are being developed as electrode materials of the lithium ion secondary battery (for example, see Patent Document 1).

In the meantime, non-graphitizable carbon materials have problems that they have low capacity and insufficient high rate characteristics (for example, see Patent Document 2).

Other than these, amorphous carbon materials have been studied, but they have problems that the cycle characteristics thereof are poor and the storage stability thereof is low (for example, see Patent Documents 3, 4 and 5). In addition, artificial graphite, non-graphitizable carbon materials, carbon fibers and mesophase microspheres are being been studied. These materials have problem that the production processes including production of the starting materials, carbonization and postprocessing are complicated and require significant resources and energy consumption, and therefore the production cost is high (for example, see Patent Document 6).

<Electric Double Layer Capacitor>

An electric double layer capacitor has characteristics which cannot be provided by batteries such as capability of being rapidly charged/discharged, endurance against overcharge/discharge, longer life since it does not involve chemical reactions, applicability in a wide range of temperature and eco-friendliness due to the absence of heavy metals. The electric double layer capacitor has been used for memory back-up power supplies conventionally. In late years, the electric double layer capacitor, having marked a drastically advanced progress in higher capacitance and a development of use for high-performance energy devices, are also studied in the applications to the power storage system in combination with a solar battery and/or a fuel cell as well as in the use for engine assisting means in hybrid vehicles.

Conventional electric double layer capacitors are excellent in the power density but, on the other hand, disadvantageous in that the energy density is inferior. In the application for energy devices, capacitors having a larger capacitance have been investigated. For increasing the capacitance of an electric double layer capacitor, use of activated carbon having a large specific surface area as an electrode material has been studied to increase the capacitance of electric double layer capacitors.

The activated carbon is produced by carbonizing carbon sources derived from coal/petroleum raw materials such as cokes and pitch, carbon sources derived from synthesized polymers such as phenolic resins or carbon sources derived from plants followed by activation treatment.

Therefore, the production process itself of the activated carbon requires steps for increasing the specific surface area such as alkali activation, steam activation or combinations of these steps. In addition, methods for increasing the specific surface area have been studied as methods for improving the capacitance in itself of the electric double layer capacitors. However, it is pointed out that improvement of the capacitor capacitance by simply increasing the surface area of the activated carbon has already reached the limit (for example, see Non-Patent Document 1). In addition, since the apparent density decreases with the increase in the specific surface area of the activated carbon, capacitance per unit volume of the electric double layer capacitor decreases and such as approach is disadvantageous practically.

On this account, a method of using a carbon material in which nitrogen, a different kind of element, is incorporated into carbon as an electrode of the electric double layer capacitor has been studied as an attempt for further increasing the capacitance of the electric double layer capacitor.

In Patent Document 7, use of a nitrogen-containing carbon material produced by carbonizing a mixture of a nitrogen-containing thermosetting resin and a carbon precursor which does not contain nitrogen is studied for the electrode of the electric double layer capacitor.

In Patent Document 8, use of a nitrogen-containing carbon material produced by heat-treating a nitrogen-containing heteroaromatic compound is studied for the electrode of the electric double layer capacitor.

In Patent Document 9, use of a nitrogen-containing carbon material produced by electrolytic reduction of polytetrafluoroethylene in a solution containing a quaternary ammonium salt is studied for the electrode of the electric double layer capacitor.

In Patent Document 10, use of a nitrogen-containing carbon material produced by synthesizing and carbonizing a melamine resin or use of a nitrogen-containing carbon material produced by compositing and carbonizing a melamine resin and a swelling fluorine mica to produce a nitrogen-containing carbon material followed by treating the same with hydrofluoric acid is studied for the electrode of the electric double layer capacitor.

In Patent Document 11, use of a nitrogen-containing carbon material produced by introducing an organic compound into the inside of the zeolite pores, heating the organic compound so that the organic compound may be polymerized followed by heating and carbonizing the resultant compound, subsequently introducing gaseous nitrogen atom-containing compound to deposit nitrogen and then performing carbonization, and finally dissolving and removing the zeolite is studied for the electrode of the electric double layer capacitor.

These nitrogen-containing carbon materials obtained by the above methods has a problem that too little nitrogen is contained or alternatively hydrogen content is too high even though much nitrogen is contained.

<Fuel Cell>

The fuel cell converts chemical energy of a fuel directly to electric energy by electrochemically oxidizing the fuel such as hydrogen and methanol in a cell. Therefore, the fuel cell has a high energy conversion efficiency. In addition, since there is no generation of $NO_x$, $SO_x$ and the like by the combustion of the fuel as in thermal power generation, the fuel cell is a clean supply source of electric energy.

Among these, a solid polymer fuel cell was developed as a power supply for spaceships since small and lightweight ones can be attained. The solid polymer fuel cell is studied as a home use for an electric supply system for fuel cell vehicles and immobilized heat and electricity supplying system, recently.

The electrode of the solid polymer fuel cell is generally constituted as a catalyst in which an active metal is dispersed on a support. Carbon materials are used for a support. The reason why carbon materials are used for a support is that conductivity is demanded besides a role as a support. Platinum and platinum alloys are common for the active metal. A supported catalyst is one in which such an active metal is highly dispersed on a support.

Conventionally, improvement of the supported catalyst has been attempted by dispersing platinum which is an active metal as finely as possible to improve the performance of the catalyst and many efforts have been particularly devoted in searching for another active metal to replace platinum which is expensive.

Under the circumstances, development aiming at enhancing the performance of the catalyst with a carbon material in which a heteroelement such as nitrogen was doped attracts attention recently.

It has been reported that oxygen reduction activity of the catalyst comprising a carbon material is improved with a nitrogen-containing carbon material. It has been reported that the high activity is thereby obtained without carrying a noble metal such as expensive platinum, or alternatively, with a slight amount of a noble metal. In addition, it has been also reported that the highly dispersed condition can be maintained by preventing the catalyst metal particles from aggregating or becoming rough particles during the production and the use of the supported catalyst (for example, see Patent Documents 12 to 17).

Patent Document 1: Japanese Patent Application Laid-Open No. 2006-164570
Patent Document 2: Japanese Patent Application Laid-Open No. 2006-140138
Patent Document 3: Japanese Patent Application Laid-Open No. 8-298111
Patent Document 4: Japanese Patent Application Laid-Open No. 2004-349217
Patent Document 5: Japanese Patent Application Laid-Open No. 2005-232291
A Patent Document 6: Japanese Patent Application Laid-Open No. 2005-44775
Patent Document 7: Japanese Patent Application Laid-Open No. 2000-1306
Patent Document 8: Japanese Patent Application Laid-Open No. 2003-137524
Patent Document 9: Japanese Patent Application Laid-Open No. 2003-247091
Patent Document 10: Japanese Patent Application Laid-Open No. 2005-239456
Patent Document 11: Japanese Patent Application Laid-Open No. 2006-310514
Patent Document 12: Japanese Patent Application Laid-Open No. 2004-79244
Patent Document 13: Japanese Patent Application Laid-Open No. 2004-207228
Patent Document 14: Japanese Patent Application Laid-Open No. 2004-330181
Patent Document 15: WO 2004/112,174/pamphlet
Patent Document 16: Japanese Patent Application Laid-Open No. 2006-331689
Patent Document 17: Japanese Patent Application Laid-Open No. 2007-26746
Non-Patent Document 1: State-of-the-art of the ubiquitous energy, p. 102, (CMC Publication (2006))

DISCLOSURE OF THE INVENTION

Problems to be Solved by the Invention

When a lithium ion secondary battery is used as an electric power source for hybrid type battery vehicles use or battery vehicles, those having capability of being charged and discharged at a high rate and superior cycle characteristics as well as further high capacity are demanded. However, the capacity, cycle characteristics and high rate characteristics are insufficient in either one of the composite materials of carbon fibers, mesophase microspheres, non-graphitizable carbon materials and graphitizable carbon materials or graphite materials which are studied as electrodes of lithium ion secondary batteries.

In addition, processes described in the above-mentioned documents relating to the electric double layer capacitor comprise firstly synthesizing special starting materials and then producing the nitrogen-containing carbon materials. Therefore, they are disadvantageous in that the production process is complicated and requires a large amount of resources and energy consumption, which leads to a problem of large production cost.

Furthermore, performance as an electrode of a fuel cell, particularly oxygen reduction activity is insufficient in the catalyst which uses nitrogen-containing carbon materials as a support described in the above-mentioned documents relating to the fuel cells. In addition, the above-mentioned processes comprise firstly synthesizing special starting materials and then producing the nitrogen-containing carbon materials, and therefore, they are disadvantageous in that the production process is complicated and requires a large amount of resources and energy consumption, which leads to a problem of large production cost. Furthermore, the nitrogen-containing carbon materials obtained from such starting materials have problems that too little nitrogen is contained or alternatively hydrogen content is too high even though much nitrogen is contained. Too high hydrogen content means that the development of conjugated structures is insufficient, and this is not preferable as an electronic material which needs conductivity.

The present invention has been accomplished in the light of the above-mentioned situation and aims at providing novel electrodes for batteries obtained from starting materials different from those in the conventional processes and batteries using the electrodes.

More specifically, an object of the present invention is to provide an electrode for a lithium ion secondary battery which is superior to the conventional lithium ion secondary batteries in high charge/discharge capacity, high rate characteristics and excellent cycle characteristics as well as storage stability and a lithium ion secondary battery using the electrode.

Another object of the present invention is to provide an electrode for an electric double layer capacitor which has a large capacitance per specific surface area and a good and rectangular cyclic voltammogram showing ideal capacitor behavior and an electric double layer capacitor using the electrode.

Still another object of the present invention is to provide an electrode for a fuel cell which has a higher activity, particularly a high oxygen reduction activity as compared with the conventional electrodes for a fuel cell comprising a supported catalyst using a nitrogen-containing carbon material as a catalyst support, and a fuel cell using the electrode.

In addition, still another object of the present invention is to provide an electrode requiring fewer resources and less energy consumption and relatively simple in the production process; production processes of an electrode for a lithium ion secondary battery, an electrode for an electric double layer capacitor and an electrode for a fuel cell, and a lithium ion secondary battery, an electric double layer capacitor and a fuel cell using the production processes thereof.

Means for Solving the Problems

As a result of having conducted intensive studies for solving the problems mentioned above, the present inventors have found an electrode which contains a carbon material obtained from an azulmic acid and have completed the present invention.

That is, the present invention is as follows.

In some embodiments, an electrode comprises a carbon material obtained from an azulmic acid and a current collector and/or a binder.

In some embodiments, a production process of an electrode comprises the steps of: obtaining a carbon material from an azulmic acid; and mixing said carbon material and a binder and/or forming a layer containing said carbon material on a current collector.

In some embodiments, an electrode for a lithium ion secondary battery comprises a carbon material which satisfies the following conditions (1), (2) and (3):

(1) carbon atoms, nitrogen atoms and hydrogen atoms contained in said electrode satisfy the following expressions (I) and (II):

$$(N_N/N_C) > 0.87 \times (N_H/N_C) - 0.06 \quad (I)$$

$$(N_N/N_C) > 0.01 \quad (II)$$

wherein $N_N$, $N_C$ and $N_H$ represent the number of nitrogen atoms, carbon atoms and hydrogen atoms, respectively;

(2) X-ray diffraction patterns obtained by using a CuKα ray as an X-ray source have a peak at a position corresponding to a diffraction angle (2θ) of 23.5 to 25.5°; and (3) a spectrogram by laser Raman spectrometry with a wave number of 1000 to 2000 cm$^{-1}$ has a peak P1 between 1355 and 1385 cm$^{-1}$ and a peak P2 between 1550 and 1620 cm$^{-1}$; a most lowest point M having a smallest height L from the baseline between the peak P1 and the peak P2; and a ratio (L/H1) of said height L to a height H1 of 0.70 to 0.95 wherein the height H1 is a height from the baseline at said peak P1.

In some embodiments, a production process of an electrode for a lithium ion secondary battery comprises the step of obtaining a carbon material which satisfies the following conditions (1), (2) and (3):

(1) carbon atoms, nitrogen atoms and hydrogen atoms contained in said electrode satisfy the following expressions (I) and (II):

$$(N_N/N_C) > 0.87 \times (N_H/N_C) - 0.06 \quad (I)$$

$$(N_N/N_C) > 0.01 \quad (II)$$

wherein $N_N$, $N_C$ and $N_H$ represent the number of nitrogen atoms, carbon atoms and hydrogen atoms, respectively;

(2) X-ray diffraction patterns obtained by using a CuKα ray as an X-ray source have a peak at a position corresponding to a diffraction angle (2θ) of 23.5 to 25.5°; and (3) a spectrogram by laser Raman spectrometry with a wave number of 1000 to 2000 cm$^{-1}$ has a peak P1 between 1355 and 1385 cm$^{-1}$ and a peak P2 between 1550 and 1620 cm$^{-1}$; a most lowest point M having a smallest height L from the baseline between the peak P1 and the peak P2; and a ratio (L/H1) of said height L to a height H1 of 0.70 to 0.95 wherein the height H1 is a height from the baseline at said peak P1.

In some embodiments, an electrode for an electric double layer capacitor comprises a carbon material which satisfies the following conditions (1), (2) and (3):

(1) carbon atoms, nitrogen atoms and hydrogen atoms contained in said electrode satisfy the following expressions (I) and (II):

$$(N_N/N_C) > 0.87 \times (N_H/N_C) - 0.06 \quad (I)$$

$$(N_N/N_C) > 0.01 \quad (II)$$

wherein $N_N$, $N_C$ and $N_H$ represent the number of nitrogen atoms, carbon atoms and hydrogen atoms, respectively;

(2) X-ray diffraction patterns obtained by using a CuKα ray as an X-ray source have a peak at a position corresponding to a diffraction angle (2θ) of 23.5 to 25.5°; and (3) a spectrogram by laser Raman spectrometry with a wave number of 1000 to 2000 cm$^{-1}$ has a peak P1 between 1355 and 1385 cm$^{-1}$ and a peak P2 between 1550 and 1620 cm$^{-1}$; a most lowest point M having a smallest height L from the baseline between the peak P1 and the peak P2; and a ratio (L/H1) of said height L to a height H1 of 0.70 to 0.95 wherein the height H1 is a height from the baseline at said peak P1.

In some embodiments, a production process of an electrode for electric double layer capacitor comprises the step of obtaining a carbon material which satisfies the following conditions (1), (2) and (3):

(1) carbon atoms, nitrogen atoms and hydrogen atoms contained in said electrode satisfy the following expressions (I) and (II):

$$(N_N/N_C) > 0.87 \times (N_H/N_C) - 0.06 \quad (I)$$

$$(N_N/N_C) > 0.01 \quad (II)$$

wherein $N_N$, $N_C$ and $N_H$ represent the number of nitrogen atoms, carbon atoms and hydrogen atoms, respectively;

(2) X-ray diffraction patterns obtained by using a CuKα ray as an X-ray source have a peak at a position corresponding to a diffraction angle (2θ) of 23.5 to 25.5°; and (3) a spectrogram by laser Raman spectrometry with a wave number of 1000 to 2000 cm$^{-1}$ has a peak P1 between 1355 and 1385 cm$^{-1}$ and a peak P2 between 1550 and 1620 cm$^{-1}$; a most lowest point M having a smallest height L from the baseline between the peak P1 and the peak P2; and a ratio (L/H1) of said height L to a height H1 of 0.70 to 0.95 wherein the height H1 is a height from the baseline at said peak P1.

In some embodiments an electrode for fuel cells comprises a carbon material which satisfies the following conditions (1), (2) and (3):

(1) carbon atoms, nitrogen atoms and hydrogen atoms contained in said electrode satisfy the following expressions (I) and (II):

$$(N_N/N_C) > 0.87 \times (N_H/N_C) - 0.06 \quad (I)$$

$$(N_N/N_C) > 0.01 \quad (II)$$

wherein $N_N$, $N_C$ and $N_H$ represent the number of nitrogen atoms, carbon atoms and hydrogen atoms, respectively;

(2) X-ray diffraction patterns obtained by using a CuKα ray as an X-ray source have a peak at a position corresponding to a diffraction angle (2θ) of 23.5 to 25.5°; and (3) a spectrogram by laser Raman spectrometry with a wave number of 1000 to 2000 cm$^{-1}$ has a peak P1 between 1355 and 1385 cm$^{-1}$ and a peak P2 between 1550 and 1620 cm$^{-1}$; a most lowest point M having a smallest height L from the baseline between the peak P1 and the peak P2; and a ratio (L/H1) of said height L to a height H1 of 0.70 to 0.95 wherein the height H1 is a height from the baseline at said peak P1.

In some embodiments a production process of an electrode for a fuel cell comprises the step of obtaining a carbon material which satisfies the following conditions (1), (2) and (3):

(1) carbon atoms, nitrogen atoms and hydrogen atoms contained in said electrode satisfy the following expressions (I) and (II):

$$(N_N/N_C) > 0.87 \times (N_H/N_C) - 0.06 \quad (I)$$

$$(N_N/N_C) > 0.01 \quad (II)$$

wherein $N_N$, $N_C$ and $N_H$ represent the number of nitrogen atoms, carbon atoms and hydrogen atoms, respectively;

(2) X-ray diffraction patterns obtained by using a CuKα ray as an X-ray source have a peak at a position corresponding to a diffraction angle (2θ) of 23.5 to 25.5°; and (3) a spectrogram by laser Raman spectrometry with a wave number of 1000 to 2000 cm$^{-1}$ has a peak P1 between 1355 and 1385 cm$^{-1}$ and a peak P2 between 1550 and 1620 cm$^{-1}$; a most lowest point M having a smallest height L from the baseline between the peak P1 and the peak P2; and a ratio (L/H1) of said height L to a height H1 of 0.70 to 0.95 wherein the height H1 is a height from the baseline at said peak P1.

Effect of the Invention

According to the present invention, an electrode for a battery obtained from a starting material which is different from the conventional starting materials and a battery which uses the electrode. More specifically, the present invention can provide an electrode for a lithium ion secondary battery which is superior to the conventional lithium ion secondary battery in high charge/discharge capacity, high rate characteristics and excellent cycle characteristics as well as storage stability and a lithium ion secondary battery using the electrode.

The present invention can also provide an electrode for an electric double layer capacitor which has a large capacitance per specific surface area and a good and rectangular cyclic voltammogram showing ideal capacitor behavior and an electric double layer capacitor using the electrode.

Furthermore, the present invention can provide an electrode for a fuel cell which has a higher activity, particularly a higher oxygen reduction activity as compared with the conventional electrodes for a fuel cell comprising a supported catalyst using a nitrogen-containing carbon material as a catalyst support, and a fuel cell using the electrode.

In addition, the present invention can provide production processes of an electrode, an electrode for a lithium ion secondary battery, an electrode for an electric double layer capacitor and an electrode for a fuel cell, requiring fewer resources and less energy consumption and relatively simple in the production processes; and a lithium ion secondary battery, an electric double layer capacitor and a fuel cell using the production processes thereof.

BEST MODE FOR CARRYING OUT THE INVENTION

Figure 1:
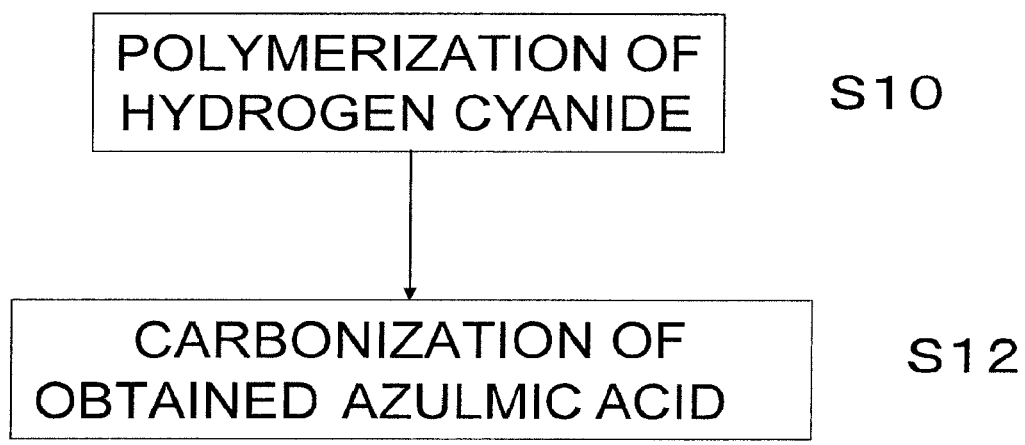
FIG. 1 illustrates a diagram of the process for producing carbon materials to be used in this embodiment.

In the following, the best mode for carrying out the invention (hereinbelow also referred to as the "embodiments of the present invention") are described in detail while referring to the drawings as necessary.

The electrode of the present invention contains a carbon material obtained from an azulmic acid (hereinbelow referred to as "AZC"). The "azulmic acid" as used herein is a general term for a polymer which is obtained mainly by polymerizing hydrogen cyanide.

The first embodiment of the present invention is an electrode for lithium ion secondary battery containing AZC obtained by just carbonizing an azulmic acid or by chemically modifying an azulmic acid and then carbonizing the thus modified azulmic acid.

FIG. 1 is a diagram of the process for producing carbon materials to be used in this embodiment. The production process of AZC according to this embodiment has Step S10 of polymerizing raw materials containing hydrogen cyanide to obtain an azulmic acid and Step S12 of just carbonizing the thus obtained azulmic acid or by chemically modifying an azulmic acid and then carbonizing the modified azulmic acid.

In the following, each step of the process is described in detail.

Firstly, in Step S10, raw materials mainly containing hydrogen cyanide are subjected to polymerization to obtain an azulmic acid. As hydrogen cyanide to be used in Step S10, one produced by a well-known method can be used, and it is produced by, for example, the following methods. The production process of hydrogen cyanide is, however, not limited to these. Specifically, hydrogen cyanide is by-produced in a method for producing acrylonitrile and methacrylonitrile by vapor phase catalytic reaction in which propylene, isobutylene, tert-butyl alcohol, propane or isobutane is reacted with ammonia, oxygen-containing gas in the presence of a catalyst. On this account, hydrogen cyanide to be used in Step S10 can be obtained very inexpensively. Since the above-mentioned vapor phase catalytic reaction is a conventionally well-known reaction, the reaction conditions may be those well known. But, for example, raw materials generating hydrogen cyanide by ammoxidation reaction such as methanol may be supplied to a reactor to increase the yield of hydrogen cyanide.

Hydrogen cyanide produced by Andrussow process in which methane which is the main ingredient of the natural gas is reacted with ammonia, oxygen-containing gas in the presence of a catalyst can be also used. This process is one which gives hydrogen cyanide very inexpensively since what is used is methane.

Of course the production process of hydrogen cyanide may be a laboratory production process using soda cyanide or the like, but it is preferable to use hydrogen cyanide produced industrially mentioned above from a viewpoint of capability of producing hydrogen cyanide in a large quantity and at a low cost.

Raw materials mainly containing hydrogen cyanide are subjected to polymerization in Step S10 to obtain azulmic acids which are mainly polymers of hydrogen cyanide with from black to blackish brown colors. Here, the content of the polymer substances other than hydrogen cyanide based on the whole amount of the raw materials mainly containing the hydrogen cyanide is preferably 40% by weight or less, more preferably 10% by weight or less, still more preferably 5% by weight or less, and particularly preferably 1% by weight or less. That is, the content of hydrogen cyanide in the raw materials mentioned above is preferably 60% by mass or more, more preferably 90% by mass or more, still more preferably 95% by mass or more and particularly preferably 99% by mass or more.

The azulmic acid can be produced by polymerizing hydrogen cyanide optionally with a little amount of a polymerizable substance other than that by various kinds of methods. Examples of the polymerization method include a method of heating liquefied hydrogen cyanide or a hydrogen cyanide aqueous solution, a method of standing still the liquefied hydrogen cyanide or a hydrogen cyanide aqueous solution for a long period of time, a method of adding a base to liquefied hydrogen cyanide or a hydrogen cyanide aqueous solution, a method of irradiating light to liquefied hydrogen cyanide or a hydrogen cyanide aqueous solution, a method of irradiating a high energy radiation to liquefied hydrogen cyanide or a hydrogen cyanide aqueous solution and a method of performing various kinds of discharging in the presence of liquefied hydrogen cyanide or a hydrogen cyanide aqueous solution, which are methods described in, for example, Angew. Chem. vol. 72, pp. 379-384 (1960) and the references cited therein or Shinku Kagaku (Vacuum Science), vol. 16, pp. 64-72 (1969) and the references cited therein.

As the base in a method of adding a base to liquefied hydrogen cyanide or a hydrogen cyanide aqueous solution to polymerize hydrogen cyanide in the presence of the base, for example, sodium hydroxide, potassium hydroxide, sodium cyanide, potassium cyanide, organic bases, ammonia, an ammonium solution can be exemplified as the base. Examples of the organic bases include primary amines $R^1NH_2$, secondary amines $R^1R^2NH$, tertiary amines $R^1R^2R^3N$, quaternary ammonium salts $R^1R^2R^3R^4N^+$. Here, $R^1$, $R^2$, $R^3$ and $R^4$, which may be the same or different from each other, represent an alkyl group having 1 to 10 carbon atoms, a phenyl group, a hexyl group and those obtained by binding these. $R^1$, $R^2$, $R^3$ and $R^4$ may have further substituents. Among these organic bases, aliphatic or cyclic aliphatic tertiary amines are preferable. Examples of such a tertiary amine include trimethylamine, triethylamine, tripropylamine, tributylamine, dicyclohexylmethylamine, tetramethylammonium hydroxide, N-methylpyrrolidine and 1,8-diazabicyclo[5.4.0]undec-7-ene (DBU). The bases mentioned above can be used singly or in combination of two or more kinds together.

Among the above-mentioned polymerization methods, a method of heating liquefied hydrogen cyanide or a hydrogen cyanide aqueous solution, a method of standing still the liquefied hydrogen cyanide or a hydrogen cyanide aqueous solution for a long period of time, a method of irradiating light to liquefied hydrogen cyanide or a hydrogen cyanide aqueous solution, a method of irradiating a high energy radiation to liquefied hydrogen cyanide or a hydrogen cyanide aqueous solution and a method of performing polymerization of liquefied hydrogen cyanide or a hydrogen cyanide aqueous solution in the presence of ammonia or an organic base are preferable.

In addition, the azulmic acid can be also produced by collecting from a hydrogen cyanide purification step as by-product in the step of ammoxidating propylene or the like.

Since the azulmic acid is hardly soluble or insoluble in a solvent, the detailed chemical structure is not identified. But the structural formula of the azulmic acid is presumed as represented by the following general formulas (A) to (F) for in the documents such as Angew. Chem., vol. 72, pp. 379-384 (1960), Shinku Kagaku (Vacuum Science), vol. 16, pp. 64-72 (1969) and Origins of Life and Evolution of the Biosphere vol. 28, pp. 461-473 (1998).

[Formula 1]

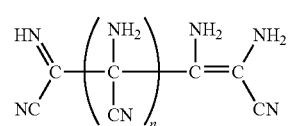

(A)

[Formula 2]

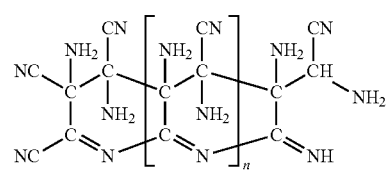

(B)

[Formula 3]

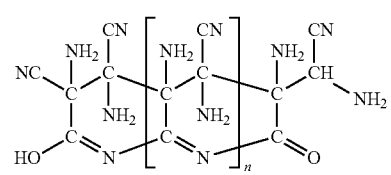

(C)

[Formula 4]

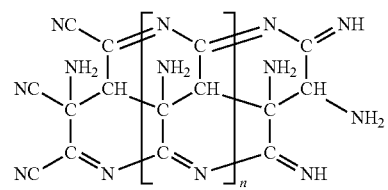

(D)

[Formula 5]

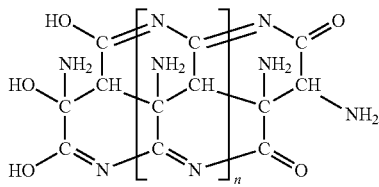

(E)

[Formula 6]

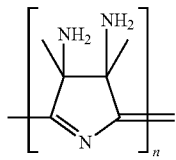

(F)

It is presumed that the actual structure may be, based on these structural formulas, those in which part of nitrogen atoms constituting a six-membered ring of the polymer structure are substituted with carbon atoms, or conversely, part of carbon atoms constituting some six-membered rings are substituted with nitrogen atoms. In addition, according to the documents mentioned above, there are functional groups such as an amino group, an imino group, a nitrile group, a hydroxyl group, the carbonyl group in the structure of the azulmic acid. It is presumed, however, that part of these functional groups may be actually substituted with each other or not present in the structure or substituted with a carboxylic acid group, a nitro group, a nitroso group, an N-oxide group, an alkyl group or the other well-known functional groups and atoms.

It is also considered that a seven-membered ring and so on may be present as the ring structure as well as the five-membered ring and six-membered ring as mentioned above. Besides, as well as linear structures, ladder structures and the structure condensed between ladders, there may be caused structures condensed or linked between these structures, and it is presumed that one structure may contain partial structure of a linear structure, a five-membered ring, a six-membered ring, a seven-membered ring and so on.

The composition of the azulmic acid used in this embodiment is measured with a CHN analyzer. The ratio of mass % of nitrogen atom to mass % of carbon atom ((mass % of nitrogen atom)/(mass % of carbon atom)) in the azulmic acid is preferably 0.2 to 1.0, more preferably 0.3 to 0.9 and particularly preferably 0.4 to 0.9. The ratio of mass % of hydrogen atom to mass % of carbon atom ((mass % of hydrogen atom)/(mass % of carbon atom)) in the azulmic acid is preferably 0.03 to 0.2, more preferably 0.05 to 0.15 and particularly preferably 0.08 to 0.11.

The azulmic acid to be used in this embodiment preferably has peaks at Raman shifts of both of 1300 to 1400 $cm^{-1}$ and 1500 to 1600 $cm^{-1}$, and particularly preferably also show peaks at both of 1360 to 1380 $cm^{-1}$ and 1530 to 1550 $cm^{-1}$ in the spectrogram by laser Raman spectrometry in the range of the wave number 1000 to 2000 $cm^{-1}$.

Furthermore, the azulmic acid to be used in this embodiment shows a strong peak at a position corresponding to a diffraction angle (2θ) of 26.8±1° in the X-ray diffraction patterns obtained by using a CuKα ray as an X-ray source in the range of 10 to 50°. This peak is preferably at a position of 26.8±0.5°, more preferably 26.8±0.2°. In addition to the above-mentioned peak, the azulmic acid to be used in the present invention may preferably show a peak at a position corresponding to a diffraction angle (2θ) of 12.3±1°, more preferably 12.3±0.5° in the X-ray diffraction patterns obtained by using a CuKα ray as an X-ray source in the range of 10 to 50°.

The X-ray diffraction patterns of the azulmic acid to be used in this embodiment mentioned above suggest that the azulmic acid has a layered structure. Such a case is not known in a precursor of a carbon material before carbonization. It is presumed that such a structure of a precursor of a carbon material before carbonization will be advantageous in the production of a carbon material having a layered structure in particular for developing the characteristics of AZC.

Next in Step S12, the azulmic acid just as it is or after modified chemically (hereinbelow the object to be carbonized is referred to as "azulmic acid or the like".) is carbonized. Various conditions in this Step S12 include the non-limiting following conditions. The azulmic acid or the like is subjected to heat treatment in inert gas atmosphere using, for example, a rotary furnace, a tunnel furnace, a tubular furnace and a fluidizing-bed furnace in Step S12. The temperature of the heat treatment is preferably 500 to 3000° C., more preferably 650 to 1800° C., still more preferably 700 to 1400° C. and particularly preferably 800 to 1100° C. Examples of the inert gas mentioned above include inert gases such as nitrogen, argon, helium, neon and carbon dioxide although not limited to these. The inert gas atmosphere may be under reduced pressure, that is, a pressure environment lower than the atmospheric pressure. Among these, it is preferable to use nitrogen gas as an inert gas. The inert gas may be allowed to stand still or the inert gas atmosphere may be flowed, but it is preferable to flow the inert gas. The oxygen concentration in the inert gas is preferably 5% by volume or less, more preferably 1% by volume or less, and particularly preferably 1000 volume ppm or less. When the inert gas atmosphere is under reduced pressure, the pressure is preferably 1 Pa to 0.05 MPa, more preferably 10 Pa to 0.03 MPa.

The time of carbonization is preferably from 10 seconds to 100 hours, more preferably 5 minutes to 10 hours, still more preferably from 15 minutes to 5 hours and particularly preferably from 30 minutes to 2 hours. When an inert gas is used, the pressure during the carbonization is preferably 0.01 to 5 MPa, more preferably from 0.05 to 1 MPa, still more preferably from 0.08 to 0.3 MPa and particularly preferably from 0.09 to 0.15 MPa. Carbonization under the high pressure condition as exceeding 5 MPa is not preferable since in that case the azulmic acid or the like is liable to be converted into a diamond structure consisting of $sp^3$ orbits. That is, it is preferable that AZC according to this embodiment takes a layered structure consisting of $sp^2$ orbits.

As described above, the azulmic acid just as it is may be subjected to carbonization by heat treatment in an inert gas atmosphere in Step S12, but it may be subjected to heat treatment in the air before that. In addition, in this embodiment, Step S11 to chemically modify the azulmic acid may be present before Step S12 and after Step S10. In this case, the chemically modified product obtained via Step S11 is subjected to carbonization in Step S12. Chemically modifying method includes reacting the azulmic acid with a chemical substance in a liquid phase or a vapor phase. In addition to or in substitution for this, the chemically modified product obtained via Step S12 may be subjected to postprocessings such as chemical modification.

The electrode of this embodiment is an electrode for a lithium ion secondary battery containing a carbon material (AZC) obtained from the azulmic acid in this way and a current collector and/or a binder.

AZC which is contained in an electrode for a lithium ion secondary battery has an average particle diameter (the median diameter based on the volume: 50% D) of preferably 1 μm or more and 100 μm or less, more preferably 5 μm or more and 50 μm or less and particularly preferably 10 μm or more and 30 μm or less. When this average particle diameter is smaller than 1 μm, contact between particles becomes poor due to aggregation, and the high rate characteristics decreases, and irreversible capacity tends to increase. On the other hand, if the average particle diameter exceeds 100 μm, unevenness is easy to occur on the surface of the electrode and causes short circuit of the battery, and tends to lower the high rate characteristics due to diffusive resistance. Here, the average particle diameter is derived from the particle size distribution measurement. Specifically, it can be measured by dispersing a sample in water performing measurement with a laser diffraction type particle size analyzer, and the average particle diameter is calculated as 50% D thereof. If a sample is not compatible with water, a surfactant may be suitably added to the water before performing measurement.

Next, the other materials used for an electrode for lithium ion secondary battery of this embodiment are described.

It is preferable that the electrode for a lithium ion secondary battery of this embodiment contains a binder. The binder is not limited in particular as long as it can bind carbon materials with each other or a carbon material with a current collector, and examples thereof include polyvinylidene fluoride, polytetrafluoroethylene, tetrafluoroethylene-hexafluoropropylene copolymer, tetrafluoroethylene-perfluoroalkylvinylether copolymer, ethylene-tetrafluoroethylene copolymer, polychlorotrifluoroethylene, ethylene-chlorotrifluoroethylene copolymer, polyvinyl fluoride, vinylidene fluoride rubbers such as vinylidene fluoride-hexafluoropropylene fluorine-containing rubber, vinylidene fluoride-hexafluoropropylene-tetrafluoroethylene fluorine-containing rubber, vinylidene fluoride-pentafluoropropylene fluorine-containing rubber, vinylidene fluoride-pentafluoropropylene-tetrafluoroethylene fluorine-containing rubber, vinylidene fluoride-perfluoromethylvinylether-tetrafluoroethylene fluorine-containing rubber, and vinylidene fluoride-chlorotrifluoroethylene fluorine-containing rubber, tetrafluoroethylene-propylene fluorine-containing rubber, tetrafluoroethylene-perfluoroalkylvinylether fluorine-containing rubber, thermoplastic fluorine-containing rubbers, polyethylene, polypropylene, styrene-butadiene rubber (SBR), isoprene rubber, butadiene rubber, ethylene-acrylic acid copolymer and ethylene-methacrylic acid copolymer. These may be used singly or two or more kinds of them can be used together at any combination ratio. The content of this binder in the electrode for a lithium ion secondary battery is preferably 1 to 20 mass % for carbon materials, more preferably 2 to 10 mass %. If the content of the binder is less than 1 mass %, the strength of the electrode tends to be insufficient and if the content of the binder is more than 20 mass %, increase in the electrical resistance and decrease in the capacity tend to occur.

It is preferable that the electrode for a lithium ion secondary battery of this embodiment contains a conductive material. Examples of the conductive material include carbon black, acetylene black, graphite or oxides or nitrides which exhibit electric conductivity. Among these, preferable conductive material is carbon black, acetylene black. These may be used singly or two or more kinds of them may be used together at any combination and ratio. The content of the conductive material is preferably 1 to 20 mass %, and particularly preferably 2 to 15 mass % for carbon materials.

It is preferable that the electrode for a lithium ion secondary battery of this embodiment contains a current collector. Furthermore, it is particularly preferable that the electrode for a lithium ion secondary battery of this embodiment contains a current collector and a binder.

Materials of the current collector is not limited in particular as long as they enable the electric connection of the electrodes and examples thereof include copper, aluminum, nickel, titanium and stainless steel. Among these, copper is preferable from a viewpoint that it is easy to process into a thin film and from a viewpoint of cost. As the shape of the current collector, a foil, a perforated foil and a mesh may be included. In addition, for example, porous materials such as porous metals (foaming metals) or carbon paper can be used as a current collector.

Next, the production process of the electrode for a lithium ion secondary battery of this embodiment is described.

The electrode for a lithium ion secondary battery of this embodiment comprises AZC and a layer (electrode layer) containing a binder and additives such as a conductive material as needed. Alternatively, the electrode for a lithium ion secondary battery of this embodiment comprises an AZC-containing layer (electrode layer) and a collection as needed, and an electrode layer mentioned above may be formed on the current collector.

The production process of the electrode for a lithium ion secondary battery of this embodiment can be performed following the well-known method except that AZC mentioned above is used. For example, a process can be included in which a binder, a conductive material and a solvent were added to a carbon material including AZC to form a slurry and the slurry is applied to a current collector and after dried, pressed to increase density to produce an electrode for a lithium ion secondary battery. Here, AZC alone may be used as a carbon material but the other carbon materials in addition to this can be also used. The binder is used as a powder or in a state as being dissolved or dispersed in a solvent.

In addition, a binder and a conductive material may be mixed into a carbon material including AZC without adding a solvent to form a paste and the paste can be made into a shape such as sheets and pellets which are incorporated with the current collector and thus an electrode for a lithium ion secondary battery can be produced.

The solvent to be used for the production of an electrode for a lithium ion secondary battery of this embodiment may be either an aqueous system or a non-aqueous system. Various solvents such as N-methylpyrrolidone, methyl ethyl ketone, cyclohexanone, isophorone, N,N-dimethylformamide, N,N-dimethylacetamide and toluene, for example, can be exemplified as a non-aqueous solvent.

The slurry mentioned above is prepared with a dispersing apparatus such as a stirrer, a pressurizing kneader, a ball mill and a super sand mill.

A thickener may be also added to the slurry mentioned above to adjust the viscosity thereof. As a thickener, for example, carboxymethyl-cellulose, methyl cellulose, hydroxymethyl cellulose, ethyl cellulose, polyvinyl alcohol, polyacrylic acid (salt), oxidized starch, phosphorylated starch and casein can be used. These may be used singly or two or more kinds of them may be used together at any combination and ratio.

The method for applying the slurry mentioned above to a current collector is not limited in particular, but, for example, well-known methods such as a doctor blade process, a metal mask print method, an electrostatic coating method, a dip coating method, a spray coating method, a roll coating method, a gravure coating method and a screen printing may be included. After the slurry is applied, it is subjected to drying treatment and then to flatting with a plane press or with a calender roller as needed. Thus the incorporation treatment of the slurry of an electrode material, which has been made into a shape such as sheets and pellets, with a current collector can be performed, for example, by well-known methods such as a roll method, a press method or combinations thereof.

As described above, an electrode for a lithium ion secondary battery containing a carbon material (AZC) obtained from an azulmic acid and a current collector and/or a binder as needed can be obtained.

The electrode for a lithium ion secondary battery containing a carbon material (AZC) obtained from an azulmic acid and a current collector and/or a binder as needed of this embodiment is preferably used as a negative electrode of a lithium ion secondary battery and AZC functions as a negative electrode active material in this case.

In the following, details of a lithium ion secondary battery comprising a negative electrode for a lithium ion secondary battery of this embodiment are illustrated. However, usable materials and production methods are not limited to the following specific examples.

The lithium ion secondary battery of this embodiment may only have an electrode for a lithium ion secondary battery of this embodiment as a negative electrode. For example, this lithium ion secondary battery comprises a separator, a negative electrode and a positive electrode which are electrodes for a lithium ion secondary battery of this embodiment and disposed to face each other through the separator and an electrolyte liquid which touched the both electrodes. This lithium ion secondary battery can be obtained by injecting an electrolyte liquid in the space between the negative and positive electrodes disposed as above.

The positive electrode can be produced by forming a positive electrode material layer which contains a positive electrode active material on a current collector in the same way as in the negative electrode.

As the current collector of the positive electrode, for example, a metal or an alloy which forms a passivity film on the surface by anodization in the electrolyte is preferably used. As such a current collector, for example, aluminum, titanium, zirconium, hafnium, niobium and tantalum and alloys including these metals can be exemplified. Among these, what is selected from aluminum, titanium and tantalum and alloys containing these metals is preferable and those selected from aluminum and alloys thereof are preferable since they are lightweight and therefore energy density is high. As a current collector of the positive electrodes, alloys such as stainless steels can be used. These metals and alloys are made into a shape of a foil, a perforated foil and a mesh form can be used as a current collector for the positive electrode.

The positive electrode active material is not limited in particular as long as it is capable of doping or intercalating lithium ions and the metal compounds such as metal oxides, metal sulfides or conductive polymers can be included. More specifically, for example, lithium cobaltate ($LiCoO_2$), lithium nickelate ($LiNiO_2$), lithium manganate ($LiMnO_2$) and complex oxides of these ($LiCo_xNi_yMn_zO_2$, X+Y+Z=1), lithium manganese spinel ($LiMn_2O$), lithium vanadium compounds, olivine type $LiMPO_4$ (M=Co, Ni, Mn, Fe), vanadium oxides ($V_2O_5$, $V_2O_3$), sulfides ($TiS_2$, $FeS_2$, $Nb_3S_4$, $Mo_3S_4$, $CoS_2$), chromium oxide ($CrO_3$), tellurium oxide ($TeO_2$), germanium oxide ($GeO_2$) and phosphoric oxide ($P_2O_5$) are included. Examples of the conductive polymers which are organic compounds include polyacetylene, polyaniline, polypyrrole, polythiophene and polyacene and conductive polymers described in well-known patent documents. When metal oxides or metal sulfides are used for positive electrode active materials, it is preferable to further incorporate a carbonaceous material such as graphite, acetylene black and Ketjen Black as a conductant agent.

The electrolyte liquid is prepared by dissolving a lithium containing electrolyte in a non-aqueous solvent. Examples of the lithium containing electrolyte include $LiPF_6$, $LiClO_4$, $LiBF_4$, $LiAsF_6$, $LiCF(CF_3)_5$, $LiCF_2(CF_3)_4$, $LiCF_3(CF_3)_3$, $LiCF_4(CF_3)_2$, $LiCF_5(CF_3)$, $LiCF_3(C_2F_5)_3$, $LiCF_3SO_3$, $LiN(CF_3SO_2)_2$, $LiN(C_2F_5SO_2)_2$, $LiN(C_2F_5CO)_2$, LiI, $LiAlCl_4$ and $LiBC_4O_8$. These are used singly or two or more kinds of them are mixed and used. Above all, it is preferable to use $LiPF_6$. The lithium salt concentration is preferably 0.1 to 3.0 mol/L, more preferably 0.5 to 2.0 mol/L.

The non-aqueous solvent, for example, can be appropriately selected from carbonates, ethers, ketones, lactones, nitriles, amines, amides, sulfur compounds, halogenated hydrocarbons, esters, nitro compounds, phosphoric acid ester compounds, sulfolane hydrocarbons and ionic liquid. Among these, carbonates, ethers, ketones, esters, lactones, halogenated hydrocarbons, sulfolane hydrocarbons and ionic liquid are preferable. Examples of more specific non-aqueous solvents include dimethyl carbonate, methylethyl carbonate, diethyl carbonate, dipropyl carbonate, methylpropyl carbonate, ethylene carbonate, propylene carbonate, vinylene carbonate, butylene carbonate, tetrahydrofuran, 2-methyltetrahydrofuran, tetrahydropyran, 1,4-dioxane, anisole, monoglyme, 4-methyl-2-pentanone, methyl acetate, ethyl acetate, methyl propionate, ethyl propanoate, 1,2-dichloroethane, γ-butyrolactone, γ-valerolactone, dimethoxyethane, diethoxyethane, methyl formate, dimethylformamide, dimethyl sulfoxide, dimethylthioformamide, sulfolane, 3-methyl-sulfolane, trimethyl phosphate, triethyl phosphate and phosphazene derivatives and mixed solvents thereof. As for the ionic liquid, 1-ethyl-3-methylimidazolium, N-methyl-N-propylpyrrolidinium can be included as the cation thereof and bis-fluorosulfonyl imide, bis-trifluorosulfonyl imide, tetrafluoroborate, $CF_3SO_3$, $(CF_3SO_2)N_2$ and $(C_2F_5SO_2)N_2$ can be included as the anion. Among these, ethylene carbonate, propylene carbonate, γ-butyrolactone, dimethyl carbonate, methylethyl carbonate and diethyl carbonate are preferable, and one kind of these can be used alone or two or more kinds of these can be mixed and used.

It is particularly preferable to use, as the non-aqueous solvent mentioned above, a mixed solvent which contains ethylene carbonate as an essential ingredient and one or more kinds of the other solvents added thereto. It is preferable that the mixture ratio of each solvent in the mixed solvent is typically as ethylene carbonate/other solvent(s)=5/95 to 70/30 (volume ratio). Since ethylene carbonate has a high solidifying point and it is solidified at the normal temperature, it can be used by adding one or more kinds of other solvents having a lower solidifying point thereto so as to lower the solidifying point of the mixed solvent. The other solvent is not particularly limited as long as it can lower the solidifying point of ethylene carbonate and examples thereof include diethyl carbonate, dimethyl carbonate, propylene carbonate, 1,2-dimethoxyethane, methylethyl carbonate, γ-butyrolactone, γ-valerolactone, γ-octanoic lactone, 1,2-diethoxyethane, 1,2-ethoxymethoxy ethane, 1,2-dibutoxy ethane, 1,3-dioxolane, tetrahydrofuran, 2-methyltetrahydrofuran, 4,4-dimethyl-1,3-dioxane, butylene carbonate and methyl formate.

In addition, electrolytes which contain, in the electrolytes mentioned above, at least one selected from the group consisting of carbonates such as vinylene carbonate and butylene carbonate, benzenes such as biphenyl and cyclohexylbenzene, sulfur compounds such as propane sultone, ethylene sulfide, hydrogen fluoride, triazole ring compounds, fluorine containing esters, hydrogen fluoride complex of tetraethylammonium fluoride and the derivatives thereof, phosphazene and the derivatives thereof, amide group-containing compounds, imino group-containing compounds and nitrogen-containing compounds can be also used.

In addition, one kind of solid or gelatinous ion conductive electrolyte alone or two or more kinds of them together can be used in combination. As the ion conductive electrolyte, for example, polyvinylidene fluoride, polyvinylidene fluoride-hexafluoro propylene copolymer, polyethylene oxide, polypropylene oxide, polyacrylonitrile, polyethylene glycol or the derivatives thereof, LiI, Li$_3$N, Li$_{1+x}$M$_x$Ti$_{2-x}$(PO$_4$)$_3$ (M=Al, Sc, Y, La), Li$_{0.5-3x}$R$_{0.5+x}$TiO$_3$ (R=La, Pr, Nd, Sm) or thio-LISICONs represented by Li$_{4-x}$Ge$_{1-x}$P$_x$S$_4$ can be used. Furthermore, oxide glass such as LiI—Li$_2$O—B$_2$O$_5$ based glass, Li$_2$O—SiO$_2$ based glass or sulfide glass such as LiI—Li$_2$S—B$_{253}$ based glass, LiI—Li$_2$S—SiS$_2$ based glass, Li$_2$S—SiS$_2$—Li$_3$PO$_4$ based glass can be used as ion conductive electrolytes. Besides, electrolytes formed by dissolving a lithium salt in a polymer, for example, an electrolyte comprising a lithium salt dissolved in polyethylene oxide which contains no electrolyte liquid can be used as an ionically conductive electrolyte.

As for the separator, materials and the shape are not limited in particular as long as it is used for an ordinary lithium ion secondary battery. This separator separates so that the negative electrode may not come in contact with the positive electrode physically, and it is preferable that the separator has a high ionic permeability. Examples of the separator include a synthetic resin film with fine pores, a woven fabric and a nonwoven fabric, and a synthetic resin film with fine pores is preferable for a separator. Examples of the materials of the synthetic resin film with fine pores include polyolefins such as polyethylene, polypropylene and polybutene, nylon, cellulose acetate, cellulose nitrate, polysulfone, polyacrylonitrile and polyvinylidene fluoride. Polyethylene and polypropylene are preferable among these. If the lithium ion secondary battery has a structure so that the positive electrode and the negative electrode do not contact directly, there is no need to use a separator.

The structure of the lithium ion secondary battery of this embodiment is not limited in particular, but is commonly constructed by usually rolling up an positive electrode and a negative electrode and a separator, which is provided as needed, in a flat spiral form to form a rolled up type electrode plate group or by laminating these elements in the form of flat plates to form a laminate type electrode plate group and sealing these electrode plate groups within a housing.

The lithium ion secondary battery of this embodiment has forms such as a paper type battery, a button type battery, a coin type battery, a laminate type battery and a cylinder type battery.

The electrode for a lithium ion secondary battery of this embodiment contains a carbon material which satisfies the following conditions (1), (2) and (3) (hereinbelow referred to as "XR carbon material") and may contain a current collector and/or a binder as mentioned above:

(1) the carbon atoms, nitrogen atoms and hydrogen atoms contained in the XR carbon material satisfy the following expressions (I) and (II):

$$(N_N/N_C) > 0.87 \times (N_H/N_C) - 0.06 \quad \text{(I)}$$

$$(N_N/N_C) > 0.01 \quad \text{(II)}$$

where $N_N$, $N_C$ and $N_H$ represent the number of nitrogen atoms, carbon atoms and hydrogen atoms, respectively;

(2) X-ray diffraction patterns obtained by using a CuKα ray as an X-ray source have a peak at a position corresponding to a diffraction angle (2θ) of 23.5 to 25.5°; and (3) a spectrogram by laser Raman spectrometry with a wave number of 1000 to 2000 cm$^{-1}$ has a peak P1 between 1355 and 1385 cm$^{-1}$ and a peak P2 between 1550 and 1620 cm$^{-1}$; a most lowest point M having a smallest height L from the baseline between the peak P1 and the peak P2; and a ratio (L/H1) of the height L to a height H1 of 0.70 to 0.95 wherein the height H1 is a height from the baseline at the peak P1.

The conditions (1) to (3) mentioned above which define the XR carbon materials according to this embodiment are described in detail in the following.

<Concerning Condition (1)>

Concerning Condition (1), the contents of carbon atoms, nitrogen atoms and hydrogen atoms, contained in the XR carbon material is measured with a CHN analyzer. The relation between the ratio ($N_N/N_C$) of the number of nitrogen atoms to the number of carbon atoms and the ratio ($N_H/N_C$) of the number of hydrogen atoms to the number of carbon atoms satisfies the following expression (I):

$$(N_N/N_C) > 0.87 \times (N_H/N_C) - 0.06 \quad \text{(I)}$$

This means that the XR carbon materials satisfying the condition expressed by expression (I) have an adequately small ($N_H/N_C$) and an adequately large ($N_N/N_C$). Such XR carbon materials are preferable since they have a sufficiently developed conjugate system and a further sufficiently higher nitrogen content. In the same viewpoint, the nitrogen atoms, carbon atoms and hydrogen atoms contained in the XR carbon materials preferably satisfy the condition expressed by the following expression (III) and more preferably satisfy the condition expressed by the following expression (IV):

$$(N_N/N_C) > 0.91 \times (N_H/N_C) - 0.045 \quad \text{(III)}$$

$$(N_N/N_C) > 1.0 \times (N_H/N_C) - 0.040 \quad \text{(IV)}$$

In addition, the ratio ($N_N/N_C$) of the number of nitrogen atoms to the number of carbon atoms and the ratio ($N_H/N_C$) of the number of hydrogen atoms to the number of carbon atoms in the XR carbon materials of this embodiment preferably satisfy the condition expressed by the following expression (V), more preferably satisfy the condition expressed by the following expression (VI) and particularly preferably satisfy the condition expressed by the following expression (VII):

$$(N_N/N_C) < 1.2 \times (N_H/N_C) + 0.15 \quad \text{(V)}$$

$$(N_N/N_C) < 1.2 \times (N_H/N_C) + 0.08 \quad \text{(VI)}$$

$$(N_N/N_C) < 1.2 \times (N_H/N_C) + 0.01 \quad \text{(VII)}$$

The ratio ($N_H/N_C$) of the number of hydrogen atoms to the number of carbon atoms in the XR carbon materials of this embodiment is preferably 0.01 to 0.5, more preferably 0.05 to 0.40 and still more preferably 0.05 to 0.35 and particularly preferably 0.05 to 0.15. The ($N_H/N_C$) not more than 0.5 is preferable since it means the material has a further sufficiently developed conjugate system and the ($N_H/N_C$) not less than 0.01 is preferable since it means a relatively higher nitrogen content.

The ratio ($N_N/N_C$) of the number of nitrogen atoms to the number of carbon atoms in the XR carbon materials of this embodiment is preferably 0.01 or more, more preferably 0.03 to 1.0 and still more preferably 0.05 to 0.7 and particularly preferably 0.05 to 0.3. When the ($N_N/N_C$) is within this numerical value range, the nitrogen content can be adequately high and the production cost of the XR carbon materials can be further controlled.

The XR carbon materials according to this embodiment may contain elements other than carbon atom, nitrogen atom and hydrogen atom. The content of the other elements is preferably 15 mass % or less, more preferably 7 mass % or less and particularly preferably 3 mass % or less for 100 mass % of the XR carbon materials according to this embodiment.

<Concerning Condition (2)>

Concerning Condition (2), it is preferable that X-ray diffraction patterns obtained by using a CuKα ray as an X-ray source have a peak at a position corresponding to a diffraction angle (2θ) of 23.5 to 25.5°. The X-ray diffraction patterns more preferably have a peak at a position corresponding to a diffraction angle (2θ) of 23.7 to 25.0°, and still more preferably have a peak at a position corresponding to a diffraction angle (2θ) of 23.9 to 24.5°. It is preferable that the peak has the maximum intensity at the diffraction angle (2θ) of 15 to 50°. The XR carbon materials according to this embodiment have a layered structure. The preferable distance between the layers is equivalent to 3.49 to 3.78 angstrom, and the more preferable distance between layers is equivalent to 3.56 to 3.75 angstrom, and the still more preferable distance between layers is equivalent to 3.64 to 3.72 angstrom.

<Concerning Condition (3)>

Concerning Condition (3), a spectrogram by laser Raman spectrometry of the XR carbon materials according to this embodiment with a wave number of 1000 to 2000 $cm^{-1}$ preferably has a peak P1 between 1355 and 1385 $cm^{-1}$ and a peak P2 between 1550 and 1620 $cm^{-1}$. The spectrogram may have at least two main peaks, i.e., the above-mentioned peak P1 and peak P2. In this spectrogram, it is more preferable to have the peak P1 between 1360 $cm^{-1}$ and 1380 $cm^{-1}$ and the peak P2 between 1570 $cm^{-1}$ and 1585 $cm^{-1}$.

In the spectrogram by laser Raman spectrometry of the XR carbon materials according to this embodiment, the ratio (L/H1) mentioned below is preferably 0.70 to 0.95, more preferably 0.86 to 0.93 and particularly preferably 0.88 to 0.91. The ratio of (L/H1) in the spectrogram by the laser Raman spectrometry of the XR carbon materials according to this embodiment as used herein is a value in conjunction with the half bandwidth of the peak (P1). If the half bandwidth decreases, the value of (L/H1) decreases, and if the half bandwidth increases, the value of (L/H1) increases. Although (L/H1) is used as an index of the half bandwidth here in this embodiment, the half bandwidth can be measured by performing peak resolution. The peak resolution can be performed with well-known methods such as those using Lorentz function and Gauss function. It is readily understood for those skilled in the art that a function showing a high fitting factor may be adequately used for peak resolution.

In a spectrogram by the laser Raman spectrometry of the XR carbon materials according to this embodiment, the half bandwidth of the peak P1 is preferably 200 to 400 $cm^{-1}$, more preferably 250 to 350 $cm^{-1}$ and particularly preferably 270 to 320 $cm^{-1}$.

In the spectrogram by laser Raman spectrometry of the XR carbon materials according to this embodiment, the ratio (L/H2) mentioned below is preferably 0.60 to 0.90, more preferably 0.63 to 0.85 and particularly preferably 0.75 to 0.84. The ratio of (L/H2) in the spectrogram by the laser Raman spectrometry of the XR carbon materials according to this embodiment as used herein is a value in conjunction with the half bandwidth of the peak (P2). If the half bandwidth decreases, the value of (L/H2) decreases, and if the half bandwidth increases, the value of (L/H2) increases. Although (L/H2) is used as an index of the half bandwidth here in this embodiment, the half bandwidth can be measured by performing peak resolution. The peak resolution can be performed with well-known methods such as those using Lorentz function and Gauss function. It is readily understood for those skilled in the art that a function showing a high fitting factor may be adequately used for peak resolution.

In a spectrogram by the laser Raman spectrometry of the XR carbon materials according to this embodiment, the half bandwidth of the peak P2 is preferably 30 to 200 $cm^{-1}$, more preferably 80 to 170 $cm^{-1}$ and particularly preferably 100 to 150 $cm^{-1}$.

The above-mentioned peaks P1 and P2 are main two peaks between 1340 $cm^{-1}$ and 1620 $cm^{-1}$ of the Raman shift in the spectrogram by the laser Raman spectrometry and the peak P1 is a peak between 1355 $cm^{-1}$ and 1385 $cm^{-1}$ and the peak P2 is a peak between 1550 $cm^{-1}$ and 1620 $cm^{-1}$.

In this embodiment, the peak intensity is measured from the spectrogram by the laser Raman spectrometry which is obtained by performing measurement with an Ar laser (wavelength 540 nm, 2 mW) at a beam size of 5μ, scanning range of 1000 to 2000 $cm^{-1}$ and accumulation time of 5 minutes.

Figure 2:
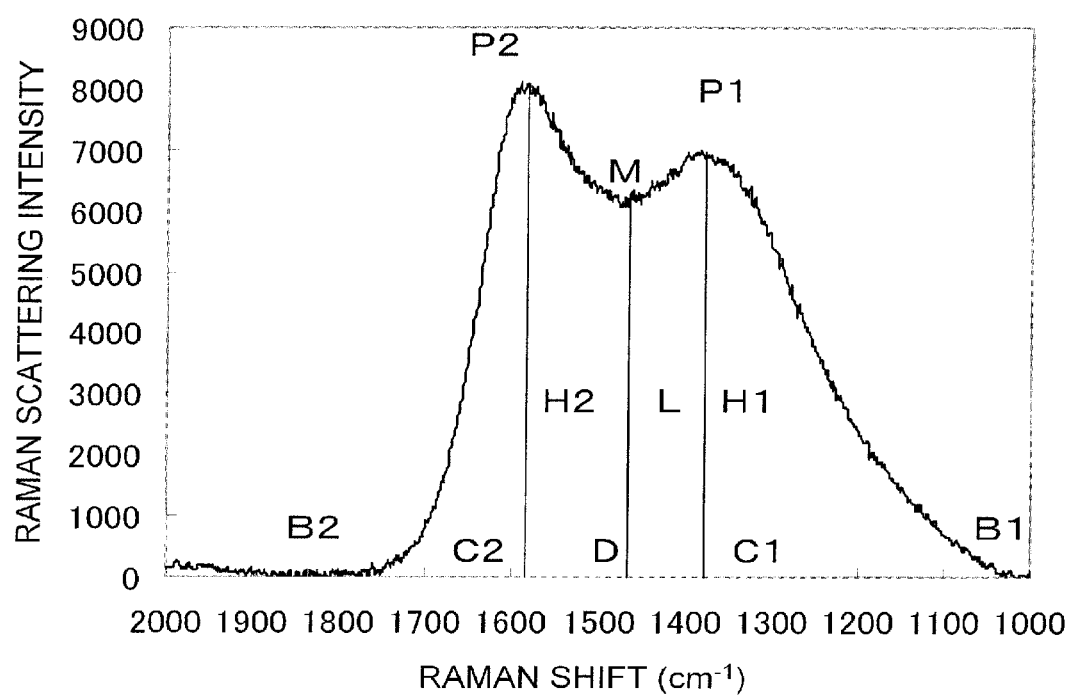
FIG. 2 is a schematic view illustrating an example of Laser Raman spectrogram of a carbon material according to this embodiment.

FIG. 2 is a schematic view of an example of the spectrogram by the laser Raman spectrometry of the XR carbon material according to this embodiment. FIG. 2 is a graph to explain the ratio of (L/H1) and the ratio of (L/H2) to be used in this embodiment, and this is not at all to limit the spectrogram by laser Raman spectrometry obtained from the XR carbon materials according to this embodiment.

Firstly the baseline for the Raman shift of 1000 to 2000 $cm^{-1}$ is determined. B1 is the smallest intensity value of 1000 to 1300 $cm^{-1}$ and B2 is the smallest intensity value of 1700 to 2000 $cm^{-1}$ as shown in FIG. 2. The baseline in the spectrogram by the laser Raman spectrometry to be used in this embodiment is the straight line that passes through both B1 and B2.

Next, C1 and C2 shown in FIG. 2 are intersections of the perpendicular lines drawn down from the peaks P1 and P2 toward the Raman shift axis and the baseline, respectively.

D is an intersection of the perpendicular line drawn down from a minimum point M having the lowest height from the baseline between the peaks P1 and P2 toward the Raman shift axis and the baseline. The height L of the minimum point M is a length from the minimum point M to the intersection D, and specifically it is the length of segment MD in the spectrogram illustrated in FIG. 2.

In the meantime, the height H1 is a length from the peak P1 to the C1 which is an intersection of the perpendicular line drawn down from the peak P1 toward the Raman shift axis and the baseline. The length of segment P1C1 is equivalent to the height H1 in the spectrogram illustrated in FIG. 2. The height H2 is a length from the peak P2 to an intersection of the perpendicular line toward the Raman shift axis and the baseline. The length of segment P2 C2 is equivalent to the height H2 in the spectrogram illustrated in FIG. 2.

It is preferable that the XR carbon materials according to this embodiment have peaks at 401.0±0.3 eV and 398.0±0.5 eV in XPS spectrogram of N1s determined by X-ray photoelectron spectroscopy analysis (XPS). It is more preferable to have peaks at 401.0±0.2 eV and 398.0±0.3 eV, and it is particularly preferable to have peaks at 401.0±0.1 eV and 398.0±0.1 eV. Here in XPS spectrogram of N1s, the peak around 401 eV corresponds to Center type and Valley-shaped nitrogen atom; the peak around 398 eV corresponds to the nitrogen atom of Top type (for example, see Carbon, vol. 40, pp. 597-608 (2002)). That is, the spectrogram having the above-mentioned peaks in XPS spectrogram of N1s means that nitrogen atoms are present as a quaternary nitrogen or pyridine nitrogen in the surface or the edge of the carbon network. The XR carbon materials according to this embodiment preferably contain a nitrogen atom in such a condition. The XPS is a spectrum obtained under the conditions of X-ray source: Al tube (Al-Kα ray), tube voltage: 15 kV, tube current: 10 mA, analysis area: 600 μm×300 μm oval area, uptake area: N1s, C1s, Pass-Energy: 20 eV and defined as values when measured with energy calibration at a peak position of C1s.

As for the XR carbon materials according to this embodiment, the wave number which gives the maximum absorption peak intensity within the wave number of 1500 to 1800 $cm^{-1}$ is preferably have a maximum peak in 1550 to $1640^{-1}$ cm in the infrared spectrum chart. In addition, it is preferable that as for the XR carbon materials according to this embodiment, the ratio (Q2/Q1) of the intensity Q2 at the absorbance peak S2 within the wave number of 2200 to 2280 $cm^{-1}$ to the intensity Q1 at the absorbance peak S1 within the wave number of 1550 to 1640 $cm^{-1}$ in the infrared spectrum chart is not more than 0.07. This intensity ratio (Q2/Q1) is preferably not more than 0.05, and particularly preferably not more than 0.02. The absorbance peak within the wave number of 2200 to 2280 $cm^{-1}$ is a peak derived from a nitrile group, and this peak intensity is preferably weak, that is, fewer nitrile groups are preferable.

Besides, it is preferable that as for the XR carbon materials according to this embodiment, the ratio (Q3/Q1) of the intensity Q3 at the absorbance peak S3 within the wave number of 2800 to 3000 $cm^{-1}$ to the intensity Q1 at the absorbance peak S1 within the wave number of 1550 to 1640 $cm^{-1}$ in the infrared spectrum chart is not more than 0.10. This intensity ratio (Q3/Q1) is preferably not more than 0.05, and particularly preferably not more than 0.02. The absorbance peak within the wave number of 2800 to 3000 $cm^{-1}$ is a peak derived from a C—H group, and this peak intensity is preferably weak, that is, fewer C—H groups are preferable.

In addition, it is preferable that as for the XR carbon materials according to this embodiment, the ratio (Q4/Q1) of the intensity Q4 at the absorbance peak S4 within the wave number of 3000 to 3500 $cm^{-1}$ to the intensity Q1 at the absorbance peak S1 within the wave number of 1550 to 1640 $cm^{-1}$ in the infrared spectrum chart is not more than 0.80. This intensity ratio (Q4/Q1) is preferably not more than 0.70, and particularly preferably not more than 0.6. The absorbance peak within the wave number of 3000 to 3500 $cm^{-1}$ is a peak derived from an N—H group or an O—H group, and this peak intensity is preferably weak, that is, fewer N—H groups or O—H groups are preferable.

The peak intensity in the chart of infrared absorption spectrum is defined as follows.

Intensity Q1 of the peak S1 is defined as follows.

A1 is assumed as a point which shows the smallest absorbance of 1000 to 1200 $cm^{-1}$ and A2 is assumed as a point which shows the smallest absorbance of 1700 to 1900 $cm^{-1}$. The baseline A1 A2 is the straight line which links A1 and A2.

Next, E1 is an intersection of the perpendicular line drawn down from the peak 51 toward the wave number axis of the infrared absorption spectrum and the baseline A1 A2. The intensity Q1 of the peak S1 is a length of segment S1E1 from S1 mentioned above to an intersection E1 of the perpendicular line drawn down from the peak S1 toward the wave number axis of the infrared absorption spectrum and the baseline.

Intensity Q2 of the peak S2 is defined as follows.

A3 is assumed as a point which shows the smallest absorbance of 2100 to 2200 $cm^{-1}$ and A4 is assumed as a point which shows the smallest absorbance of 2280 to 2400 $cm^{-1}$. The baseline A3 A4 is the straight line which links A3 and A4.

Next, E2 is an intersection of the perpendicular line drawn down from the peak S2 toward the wave number axis of the infrared absorption spectrum and the baseline A3 A4. The intensity Q2 of the peak S2 is a length of segment S2E2 from S2 mentioned above to an intersection E2 of the perpendicular line drawn down from the peak S2 toward the wave number axis of the infrared absorption spectrum and the baseline.

Intensity Q3 of the peak S3 is defined as follows.

A5 is assumed as a point which shows the smallest absorbance of 2700 to 2800 $cm^{-1}$ and A6 is assumed as a point which shows the smallest absorbance of 3000 to 3100 $cm^{-1}$. The baseline A5A6 is the straight line which links A5 and A6.

Next, E3 is an intersection of the perpendicular line drawn down from the peak S3 toward the wave number axis of the infrared absorption spectrum and the baseline A5A6. The intensity Q3 of the peak S3 is a length of segment S3E3 from S3 mentioned above to an intersection E3 of the perpendicular line drawn down from the peak S3 toward the wave number axis of the infrared absorption spectrum and the baseline.

Intensity Q4 of the peak S4 is defined as follows.

A7 is assumed as a point which shows the smallest absorbance of 2500 to 3000 $cm^{-1}$ and A8 is assumed as a point which shows the smallest absorbance of 3500 to 4000 $cm^{-1}$. The baseline A7A8 is the straight line which links A7 and A8.

Next, E4 is an intersection of the perpendicular line drawn down from the peak S4 toward the wave number axis of the infrared absorption spectrum and the baseline A7A8. The intensity Q4 of the peak S4 is a length of segment S4E4 from S4 mentioned above to an intersection E4 of the perpendicular line drawn down from the peak S4 toward the wave number axis of the infrared absorption spectrum and the baseline.

An electrode for a lithium ion secondary battery, a negative electrode for a lithium ion secondary battery and a lithium ion secondary battery can be obtained using the XR carbon materials of this embodiment described above. These may be similar in the embodiment as described above except that the XR carbon materials described above are used in place of the carbon materials described above, and therefore detailed description is omitted here.

The second embodiment of the present invention is an electrode for an electric double layer capacitor containing a carbon material (AZC) obtained by just carbonizing an azulmic acid as it is or by chemically modifying an azulmic acid and then carbonizing the thus modified azulmic acid. With regard to AZC, similar material as in the first embodiment described above may be used, and therefore detailed description thereabout is omitted here.

The other materials used for an electrode for an electric double layer capacitor of this embodiment are described.

It is preferable that the electrode for an electric double layer capacitor of this embodiment contain a binder. The binder is not limited in particular as long as it can bind carbon materials with each other or a carbon material with a current collector, and examples thereof include polyvinylidene fluoride, polytetrafluoroethylene, tetrafluoroethylene-hexafluoropropylene copolymer, tetrafluoroethylene-perfluoroalkylvinylether copolymer, ethylene-tetrafluoroethylene copolymer, polychlorotrifluoroethylene, ethylene-chlorotrifluoroethylene copolymer, polyvinyl fluoride, vinylidene fluoride rubbers such as vinylidene fluoride-hexafluoropropylene fluorine-containing rubber, vinylidene fluoride-hexafluoropropylene-tetrafluoroethylene fluorine-containing rubber, vinylidene fluoride-pentafluoropropylene fluorine-containing rubber, vinylidene fluoride-pentafluoropropylene-tetrafluoroethylene fluorine-containing rubber, vinylidene fluoride-perfluoromethylvinylether-tetrafluoroethylene fluorine-containing rubber, and vinylidene fluoride-chlorotrifluoroethylene fluorine-containing rubber, tetrafluoroethylene-propylene fluorine-containing rubber, tetrafluoroethylene-perfluoroalkylvinylether fluorine-containing rubber, thermoplastic fluorine-containing rubbers, polyethylene, polypropylene, styrene-butadiene rubber (SBR), isoprene rubber, butadiene rubber, ethylene-acrylic acid copolymer and ethylene-methacrylic acid copolymer. These may be used singly or two or more kinds of them can be used together at any combination ratio. The content of this binder in the electrode for an electric double layer capacitor is preferably 1 to 20 mass % for carbon materials, more preferably 2 to 10 mass %. If the content of the binder is less than 1 mass %, the strength of the electrode tends to be insufficient and if the content of the binder is more than 20 mass %, increase in the electrical resistance and decrease in the capacitance tend to occur.

It is preferable that the electrode for an electric double layer capacitor of this embodiment contains a conductive material. Examples of the conductive material include carbon black, acetylene black, graphite or oxides or nitrides which exhibit electric conductivity. Among these, preferable conductive material is carbon black, acetylene black. These may be used singly or two or more kinds of them may be used together at any combination and ratio. The content of the conductive material is preferably 1 to 20 mass %, and particularly preferably 2 to 15 mass % for carbon materials.

It is preferable for the electrode for an electric double layer capacitor of this embodiment to contain a current collector. Furthermore, it is particularly preferable that the electrode for an electric double layer capacitor of this embodiment contains a current collector and a binder.

Materials of the current collector in the electrodes for an electric double layer capacitor of this embodiment is not limited in particular as long as they enable the electric connection of the electrodes and examples thereof include copper, aluminum, nickel, titanium, tantalum, stainless steel and platinum. As the shape of the current collector, a foil, a perforated foil and a mesh may be included. In addition, for example, porous materials such as porous metals (foaming metals) or carbon paper can be used as a current collector.

The production process of the electrode for an electric double layer capacitor of this embodiment is described.

The electrode for an electric double layer capacitor of this embodiment comprises AZC and a layer (electrode layer) containing a binder and additives such as a conductive material as needed. Alternatively, the electrode for an electric double layer capacitor of this embodiment comprises an AZC-containing layer (electrode layer) and a collection as needed, and an electrode layer mentioned above may be formed on the current collector.

The production process of the electrode for an electric double layer capacitor of this embodiment can be performed following the well-known method except that AZC mentioned above is used. For example, a process can be included in which a binder, a conductive material and an aqueous or non-aqueous solvent were added to a carbon material including AZC to form a slurry and the slurry is applied to a current collector and after dried, pressed to increase density to produce an electrode for an electric double layer capacitor. Here, AZC alone may be used as a carbon material but the other carbon materials in addition to this can be also used. The binder is used as a powder or in a state as being dissolved or dispersed in a solvent. It is preferable to use a solvent other than water as a solvent mentioned above when a non-aqueous electric double layer capacitor is produced. Examples of such a solvent include N-methylpyrrolidone, methyl ethyl ketone, cyclohexanone, isophorone, N,N-dimethylformamide, N,N-dimethylacetamide and toluene.

In addition, a binder and a conductive material may be mixed into a carbon material including AZC without adding a solvent to form a paste and the paste can be made into a shape such as sheets and pellets which are incorporated with the current collector and thus an electrode for an electric double layer capacitor can be produced.

The slurry mentioned above is prepared with a dispersing apparatus such as a stirrer, a pressurizing kneader, a ball mill and a super sand mill.

A thickener may be also added to the slurry mentioned above to adjust the viscosity thereof. As a thickener, for example, carboxymethyl-cellulose, methyl cellulose, hydroxymethyl cellulose, ethyl cellulose, polyvinyl alcohol, polyacrylic acid (salt), polyvinylpyrrolidone, oxidized starch, phosphorylated starch and casein can be used. These may be used singly or two or more kinds of them may be used together at any combination and ratio.

The method for applying the slurry mentioned above to a current collector is not limited in particular, but, for example, well-known methods such as a doctor blade process, a metal mask print method, an electrostatic coating method, a dip coating method, a spray coating method, a roll coating method, a gravure coating method and a screen printing may be included. After the slurry is applied, it is subjected to drying treatment and then to flatting with a plane press or with a calender roller as needed. Thus the incorporation treatment of the slurry of an electrode material, which has been made into a shape such as sheets and pellets, with a current collector can be performed, for example, by well-known methods such as a roll method, a press method or combinations thereof.

As described above, an electrode for an electric double layer capacitor containing a carbon material (AZC) obtained from an azulmic acid and a current collector and/or a binder as needed can be obtained.

In the following, details of an electric double layer capacitor comprising an electrode for an electric double layer capacitor of this embodiment is illustrated. However, usable materials and production methods are not limited to the following specific examples.

The electric double layer capacitor of this embodiment comprises a pair of electrodes, a separator disposed between these electrodes and an aqueous or non-aqueous electrolyte, wherein the electrode for an electric double layer capacitor of this embodiment is used either one of or both of the pair electrodes, particularly both of the electrodes.

Firstly, an electric double layer capacitor using an aqueous electrolyte is described.

The electrolyte liquid is prepared by dissolving an ionically conductive salt in water.

As an ionically conductive salt, salts which are combinations of a cation such as an alkali metal such as sodium and potassium or a proton with an anion which forms an inorganic acid such as sulfuric acid, nitric acid, hydrochloric acid, bromic acid, phosphoric acid, tetrafluoroboric acid, hexafluorophosphoric acid and hexafluorosilicic acid or an anion which forms an organic acid such as a saturated monocarboxylic acid, an aliphatic carboxylic acid, an oxycarboxylic acid, p-toluenesulfonic acid, polyvinyl sulfonic acid and lauric acid are preferable. Examples of such a salt include NaCl, KCl, NaBr and $H_2SO_4$. These salts are used singly or two or more kinds of them are mixed and used. The concentration of these salts is preferably 0.1 to 10 mol/L, more preferably 0.5 to 3 mol/L.

Next, an electric double layer capacitor using a non-aqueous electrolyte is described.

The electrolyte liquid is prepared by dissolving an ionically conductive salt in a non-aqueous solvent.

As the ionically conductive salts, salts which are combinations of a quaternary onium cation represented by a general formula: $R^1R^2R^3R^4N^+$ or $R^1R^2R^3R^4P^+$ or the like (wherein $R^1, R^2, R^3, R^4$, which may be the same or different from each other, are alkyl groups having 1 to 10 carbon atoms) and an anion such as $BF_4^-$, $N(CF_3SO_2)_2^-$, $PF_6^-$, $ClO_4^-$ or the like are preferable.

Specific examples of such a salt include $(C_2H_5)_4NBF_4$, $(C_2H_5)_3CH_5NBF_4$, $(C_4H_9)_4NBF_4$, $(C_6H_{13})_4NBF_4$, $(C_2H_5)_3CH_3PBF_4$, $(C_2H_5)_4PBF_4$, $(C_3H_7)_4PBF_4$, $(C_4H_9)_4PBF_4$, $(C_6H_{13})_4PBF_4$, $(C_4H_9)_3CH_3PBF_4$, $(C_2H_5)_3(Ph\text{-}CH_2)PBF_4$ (Ph represents a phenyl group), $(C_2H_5)_4PPF_6$, $(C_2H_5)PCF_3SO_2$, $(C_2H_5)_4NBF_4$, $(C_4H_9)_4NBF_4$, $(C_6H_{13})_4NBF_4$, $(C_2H_5)_6NPF_6$, $LiBF_4$, $LiCF_3SO_3$, $LiPF_6$, $LiClO_4$, $LiBF_4$, $LiAsF_6$, $LiCF(CF_3)_5$, $LiCF_2(CF_3)_4$, $LiCF_3(CF_3)_3$, $LiCF_4(CF_3)_2$, $LiCF_5(CF_3)$, $LiCF_3(C_2F_5)_3$, $LiCF_3SO_3$, $LiN(CF_3SO_2)_2$, $LiN(C_2F_5SO_2)_2$, $LiN(C_2F_5CO)_2$, LiI, $LiAlCl_4$ and $LiBC_4O_8$. These salts are used singly or two or more kinds of them are mixed and used. The concentration of these salts is preferably 0.1 to 5.0 mol/L, more preferably 0.5 to 2.0 mol/L.

The non-aqueous solvent, for example, can be appropriately selected from carbonates, ethers, ketones, lactones, nitriles, amines, amides, sulfur compounds, halogenated hydrocarbons, esters, nitro compounds, phosphoric acid ester compounds, sulfolane hydrocarbons and ionic liquid. Among these, carbonates, ethers, ketones, esters, lactones, halogenated hydrocarbons, sulfolane hydrocarbons and ionic liquid are preferable.

Examples of more specific non-aqueous solvents include dimethyl carbonate, methylethyl carbonate, diethyl carbonate, dipropyl carbonate, methylpropyl carbonate, ethylene carbonate, propylene carbonate, vinylene carbonate, butylene carbonate, tetrahydrofuran, 2-methyltetrahydrofuran, tetrahydropyran, 1,4-dioxane, anisole, monoglyme, 4-methyl-2-pentanone, methyl acetate, ethyl acetate, methyl propionate, ethyl propanoate, 1,2-dichloroethane, γ-butyrolactone, γ-valerolactone, dimethoxyethane, diethoxyethane, methyl formate, dimethylformamide, dimethyl sulfoxide, dimethylthioformamide, sulfolane, 3-methyl-sulfolane, trimethyl phosphate, triethyl phosphate and phosphazene derivatives and mixed solvents thereof. As for the ionic liquid, 1-ethyl-3-methylimidazolium, N-methyl-N-propylpyrrolidinium can be included as the cation thereof and bis-fluorosulfonyl imide, bis-trifluorosulfonyl imide, tetrafluoroborate, $CF_3SO_3$, $(CF_3SO_2)N_2$ and $(C_2F_5SO_2)N_2$ can be included as the anion. Among these, ethylene carbonate, propylene carbonate, γ-butyrolactone, dimethyl carbonate, methylethyl carbonate and diethyl carbonate are preferable, and one kind of these can be used alone or two or more kinds of these can be mixed and used.

As for the separator, materials and the shape are not limited in particular as long as it is used for an ordinary electric double layer capacitor. This separator separates the electrodes so that the electrodes may not come in contact with each other physically, and it is preferable that the separator has a high ionic permeability. Examples of the separator include a synthetic resin film with fine pores, a woven fabric and a non-woven fabric, and a synthetic resin film with fine pores is preferable for a separator. Examples of the materials of the synthetic resin film with fine pores include polyolefins such as polyethylene, polypropylene and polybutene, nylon, cellulose acetate, cellulose nitrate, polysulfone, polyacrylonitrile, polyvinylidene fluoride and aramid. Polyethylene and polypropylene are preferable among these. If the electric double layer capacitor has a structure so that the electrodes do not contact directly with each other, there is no need to use a separator.

The structure of the electric double layer capacitor of this embodiment is not limited in particular, but is commonly constructed by usually rolling up a pair of electrodes and a separator disposed therebetween in a flat spiral form to form a rolled up type electrode plate group or by laminating these elements in the form of flat plates to form a laminate type electrode plate group and sealing these electrode plate groups within a housing.

The electric double layer capacitor of this embodiment has forms such as a paper type, a button type, a coin type, a laminate type and a cylinder type.

The electrode for an electric double layer capacitor of this embodiment contains a carbon material which satisfies the following conditions (1), (2) and (3) (hereinbelow referred to as "XR carbon material") and may contain a current collector and/or a binder as mentioned above.

(1) the carbon atoms, nitrogen atoms and hydrogen atoms, contained in the XR carbon material satisfy the following expressions (I) and (II):

$$(N_N/N_C) > 0.87 \times (N_H/N_C) - 0.06 \quad \text{(I)}$$

$$(N_N/N_C) > 0.01 \quad \text{(II)}$$

(wherein $N_N$, $N_C$ and $N_H$ represent the number of nitrogen atoms, carbon atoms and hydrogen atoms, respectively);

(2) X-ray diffraction patterns obtained by using a CuKα ray as an X-ray source have a peak at a position corresponding to a diffraction angle (2θ) of 23.5 to 25.5°; and (3) a spectrogram by laser Raman spectrometry with a wave number of 1000 to 2000 cm$^{-1}$ has a peak P1 between 1355 and 1385 cm$^{-1}$ and a peak P2 between 1550 and 1620 cm$^{-1}$; a most lowest point M having a smallest height L from the baseline between the peak P1 and the peak P2; and a ratio (L/H1) of the height L to a height H1 of 0.70 to 0.95 wherein the height H1 is a height from the baseline at the peak P1.

The conditions (1) to (3) mentioned above which define the XR carbon materials according to this embodiment are described in detail in the following.

<Concerning Condition (1)>

Concerning Condition (1), the contents of carbon atoms, nitrogen atoms and hydrogen atoms, contained in the XR carbon material is measured with a CHN analyzer.

The relation between the ratio ($N_N/N_C$) of the number of nitrogen atoms to the number of carbon atoms and the ratio ($N_H/N_C$) of the number of hydrogen atoms to the number of carbon atoms satisfies the following expression (I):

$$(N_N/N_C) > 0.87 \times (N_H/N_C) - 0.06 \quad \text{(I)}$$

This means that the XR carbon materials satisfying the condition expressed by expression (I) have an adequately small ($N_H/N_C$) and an adequately large ($N_N/N_C$). Such XR carbon materials are preferable since they have a sufficiently developed conjugate system and a further sufficiently higher nitrogen content. In the same viewpoint, the nitrogen atoms, carbon atoms and hydrogen atoms contained in the XR carbon materials preferably satisfy the condition expressed by the following expression (III) and more preferably satisfy the condition expressed by the following expression (IV):

$$(N_N/N_C) > 0.91 \times (N_H/N_C) - 0.045 \quad \text{(III)}$$

$$(N_N/N_C) > 1.0 \times (N_H/N_C) - 0.040 \quad \text{(IV)}$$

In addition, the ratio ($N_N/N_C$) of the number of nitrogen atoms to the number of carbon atoms and the ratio ($N_H/N_C$) of the number of hydrogen atoms to the number of carbon atoms in the XR carbon materials of this embodiment preferably satisfy the condition expressed by the following expression (V), more preferably satisfy the condition expressed by the following expression (VI) and particularly preferably satisfy the condition expressed by the following expression (VII):

$$(N_N/N_C) < 1.2 \times (N_H/N_C) + 0.15 \quad \text{(V)}$$

$$(N_N/N_C) < 1.2 \times (N_H/N_C) + 0.08 \quad \text{(VI)}$$

$$(N_N/N_C) < 1.2 \times (N_H/N_C) + 0.01 \quad \text{(VII)}$$

The ratio ($N_H/N_C$) of the number of hydrogen atoms to the number of carbon atoms in the XR carbon materials of this embodiment is preferably 0.01 to 0.5, more preferably 0.05 to 0.40 and still more preferably 0.05 to 0.35 and particularly preferably 0.05 to 0.15. The ($N_H/N_C$) not more than 0.5 is preferable since it means the material has a further sufficiently developed conjugate system and the ($N_H/N_C$) not less than 0.01 is preferable since it means a relatively higher nitrogen content.

The ratio ($N_N/N_C$) of the number of nitrogen atoms to the number of carbon atoms in the XR carbon materials of this embodiment is preferably 0.01 or more, more preferably 0.03 to 1.0 and still more preferably 0.05 to 0.7 and particularly preferably 0.08 to 0.4, and extremely preferably 0.3 to 0.4. When the ($N_N/N_C$) is within this numerical value range, the nitrogen content can be adequately high and the production cost of XR carbon materials can be further controlled.

The XR carbon materials according to this embodiment may contain elements other than carbon atom, nitrogen atom and hydrogen atom. The content of the other elements is preferably 15 mass % or less, more preferably 7 mass % or less and particularly preferably 3 mass % or less for 100 mass % of the XR carbon materials according to this embodiment.

<Concerning Condition (2)>

Concerning Condition (2), it is preferable that X-ray diffraction patterns of the XR carbon materials obtained by using a CuKα ray as an X-ray source have a peak at a position corresponding to a diffraction angle (2θ) of 23.5 to 25.5°. The X-ray diffraction patterns more preferably have a peak at a position corresponding to a diffraction angle (2θ) of 23.7 to 25.0°, and still more preferably have a peak at a position corresponding to a diffraction angle (2θ) of 23.9 to 24.5°. It is preferable that the peak has the maximum intensity at the diffraction angle (2θ) of 15 to 50°. The XR carbon materials according to this embodiment have a layered structure. The preferable distance between the layers is equivalent to 3.49 to 3.78 angstrom, and the more preferable distance between layers is equivalent to 3.56 to 3.75 angstrom, and the still more preferable distance between layers is equivalent to 3.64 to 3.72 angstrom.

<Concerning Condition (3)>

Concerning Condition (3), a spectrogram by laser Raman spectrometry of the XR carbon materials according to this embodiment with a wave number of 1000 to 2000 $cm^{-1}$ preferably has a peak P1 between 1355 and 1385 $cm^{-1}$ and a peak P2 between 1550 and 1620 $cm^{-1}$. The spectrogram may have at least two main peaks, i.e., the above-mentioned peak P1 and peak P2. In this spectrogram, it is more preferable to have the peak P1 between 1360 $cm^{-1}$ and 1380 $cm^{-1}$ and the peak P2 between 1570 $cm^{-1}$ and 1585 $cm^{-1}$.

In the spectrogram by laser Raman spectrometry of the XR carbon materials according to this embodiment, the ratio (L/H1) mentioned below is preferably 0.70 to 0.95, more preferably 0.86 to 0.93 and particularly preferably 0.88 to 0.91. The ratio of (L/H1) in the spectrogram by the laser Raman spectrometry of the XR carbon materials according to this embodiment as used herein is a value in conjunction with the half bandwidth of the peak (P1). If the half bandwidth decreases, the value of (L/H1) decreases, and if the half bandwidth increases, the value of (L/H1) increases. Although (L/H1) is used as an index of the half bandwidth here in this embodiment, the half bandwidth can be measured by performing peak resolution. The peak resolution can be performed with well-known methods such as those using Lorentz function and Gauss function. It is readily understood for those skilled in the art that a function showing a high fitting factor may be adequately used for peak resolution.

In a spectrogram by the laser Raman spectrometry of the XR carbon materials according to this embodiment, the half bandwidth of the peak P1 is preferably 200 to 400 $cm^{-1}$, more preferably 250 to 350 $cm^{-1}$ and particularly preferably 270 to 320 $cm^{-1}$.

In the spectrogram by laser Raman spectrometry of the XR carbon materials according to this embodiment, the ratio (L/H2) mentioned below is preferably 0.60 to 0.90, more preferably 0.63 to 0.85 and particularly preferably 0.75 to 0.84. The ratio of (L/H2) in the spectrogram by the laser Raman spectrometry of the XR carbon materials according to this embodiment as used herein is a value in conjunction with the half bandwidth of the peak (P2). If the half bandwidth decreases, the value of (L/H2) decreases, and if the half bandwidth increases, the value of (L/H2) increases. Although (L/H2) is used as an index of the half bandwidth here in this embodiment, the half bandwidth can be measured by performing peak resolution. The peak resolution can be performed with well-known methods such as those using Lorentz function and Gauss function. It is readily understood for those skilled in the art that a function showing a high fitting factor may be adequately used for peak resolution.

In a spectrogram by the laser Raman spectrometry of the XR carbon materials according to this embodiment, the half bandwidth of the peak P2 is preferably 30 to 200 $cm^{-1}$, more preferably 80 to 170 $cm^{-1}$ and particularly preferably 100 to 150 $cm^{-1}$.

The above-mentioned peaks P1 and P2 are main two peaks between 1340 $cm^{-1}$ and 1620 $cm^{-1}$ of the Raman shift in the spectrogram by the laser Raman spectrometry and the peak P1 is a peak between 1355 $cm^{-1}$ and 1385 $cm^{-1}$ and the peak P2 is a peak between 1550 $cm^{-1}$ and 1620 $cm^{-1}$.

In this embodiment, the peak intensity is measured from the spectrogram by the laser Raman spectrometry which is obtained by performing measurement with an Ar laser (wavelength 540 nm, 2 mW) at a beam size of 5μ, scanning range of 1000 to 2000 $cm^{-1}$ and accumulation time of 5 minutes.

FIG. 2 is a schematic view of an example of the spectrogram by the laser Raman spectrometry of the XR carbon material according to this embodiment. FIG. 2 is a graph to explain the ratio of (L/H1) and the ratio of (L/H2) to be used in this embodiment, and this is not at all to limit the spectrogram by laser Raman spectrometry obtained from XR carbon materials according to this embodiment.

Firstly the baseline for the Raman shift of 1000 to 2000 $cm^{-1}$ is determined. B1 is the smallest intensity value of 1000 to 1300 $cm^{-1}$ and B2 is the smallest intensity value of 1700 to 2000 $cm^{-1}$ as shown in FIG. 2. The baseline in the spectrogram by the laser Raman spectrometry to be used in this embodiment is the straight line that passes through both B1 and B2.

Next, C1 and C2 shown in FIG. 2 are intersections of the perpendicular lines drawn down from the peaks P1 and P2 toward the Raman shift axis and the baseline, respectively. D is an intersection of the perpendicular line drawn down from a minimum point M having the lowest height from the baseline between the peaks P1 and P2 toward the Raman shift axis and the baseline. The height L of the minimum point M is a length from the minimum point M to the intersection D, and specifically it is the length of segment MD in the spectrogram illustrated in FIG. 2.

In the meantime, the height H1 is a length from the peak P1 to the C1 which is an intersection of the perpendicular line drawn down from the peak P1 toward the Raman shift axis and the baseline. The length of P1C1 is equivalent to the height H1 in the spectrogram illustrated in FIG. 2. The height H2 is a length from the peak P2 to an intersection of the perpendicular line toward the Raman shift axis and the baseline. The length of P2 C2 is equivalent to the height H2 in the spectrogram illustrated in FIG. 2.

It is preferable that the XR carbon materials according to this embodiment have peaks at 401.0±0.3 eV and 398.0±0.5 eV in XPS spectrogram of N1s determined by X-ray photoelectron spectroscopy analysis (XPS). It is more preferable to have peaks at 401.0±0.2 eV and 398.0±0.3 eV, and it is particularly preferable to have peaks at 401.0±0.1 eV and 398.0±0.1 eV. Here in XPS spectrogram of N1s, the peak around 401 eV corresponds to Center type and Valley-shaped nitrogen atom; the peak around 398 eV corresponds to the nitrogen atom of Top type (for example, see Carbon, vol. 40, pp. 597-608 (2002)). That is, the spectrogram having the above-mentioned peaks in XPS spectrogram of N1s means that nitrogen atoms are present as a quaternary nitrogen or pyridine nitrogen in the surface or the edge of the carbon network. The XR carbon materials according to this embodiment preferably contain a nitrogen atom in such a condition. The XPS is a spectrum obtained under the conditions of X-ray source: Al tube (Al-Kα ray), tube voltage: 15 kV, tube current: 10 mA, analysis area: 600 m×300 μm oval area, uptake area: N1s, C1s, Pass-Energy: 20 eV and defined as values when measured with energy calibration at a peak position of C1s.

As for the XR carbon materials according to this embodiment, the wave number which gives the maximum absorption peak intensity within the wave number of 1500 to 1800 $cm^{-1}$ is preferably have a maximum peak in 1550 to 1640 $cm^{-1}$ in the infrared spectrum chart. In addition, it is preferable that as for the XR carbon materials according to this embodiment, the ratio (Q2/Q1) of the intensity Q2 at the absorbance peak S2 within the wave number of 2200 to 2280 $cm^{-1}$ to the intensity Q1 at the absorbance peak S1 within the wave number of 1550 to 1640 $cm^{-1}$ in the infrared spectrum chart is not more than 0.07. This intensity ratio (Q2/Q1) is preferably not more than 0.05, and particularly preferably not more than 0.02. The absorbance peak within the wave number of 2200 to 2280 $cm^{-1}$ is a peak derived from a nitrile group, and this peak intensity is preferably weak, that is, fewer nitrile groups are preferable.

Besides, it is preferable that as for the XR carbon materials according to this embodiment, the ratio (Q3/Q1) of the intensity Q3 at the absorbance peak S3 within the wave number of 2800 to 3000 $cm^{-1}$ to the intensity Q1 at the absorbance peak S1 within the wave number of 1550 to 1640 $cm^{-1}$ in the infrared spectrum chart is not more than 0.10. This intensity ratio (Q2/Q1) is preferably not more than 0.05, and particularly preferably not more than 0.02. The absorbance peak within the wave number of 2800 to 3000 $cm^{-1}$ is a peak derived from a C—H group, and this peak intensity is preferably weak, that is, fewer C—H groups are preferable.

In addition, it is preferable that as for the XR carbon materials according to this embodiment, the ratio (Q4/Q1) of the intensity Q4 at the absorbance peak S4 within the wave number of 3000 to 3500 $cm^{-1}$ to the intensity Q1 at the absorbance peak S1 within the wave number of 1550 to 1640 $cm^{-1}$ in the infrared spectrum chart is not more than 0.80. This intensity ratio (Q4/Q1) is preferably not more than 0.70, and particularly preferably not more than 0.6. The absorbance peak within the wave number of 3000 to 3500 $cm^{-1}$ is a peak derived from an N—H group or an O—H group, and this peak intensity is preferably weak, that is, fewer N—H groups or O—H groups are preferable.

The peak intensity in the chart of infrared absorption spectrum is defined as follows.

Intensity Q1 of the peak S1 is defined as follows.

A1 is assumed as a point which shows the smallest absorbance of 1000 to 1200 $cm^{-1}$ and A2 is assumed as a point which shows the smallest absorbance of 1700 to 1900 $cm^{-1}$. The baseline A1 A2 is the straight line which links A1 and A2.

Next, E1 is an intersection of the perpendicular line drawn down from the peak S1 toward the wave number axis of the infrared absorption spectrum and the baseline A1 A2. The intensity Q1 of the peak S1 is a length of segment S1E1 from S1 mentioned above to an intersection E1 of the perpendicular line drawn down from the peak S1 toward the wave number axis of the infrared absorption spectrum and the baseline.

Intensity Q2 of the peak S2 is defined as follows.

A3 is assumed as a point which shows the smallest absorbance of 2100 to 2200 $cm^{-1}$ and A4 is assumed as a point which shows the smallest absorbance of 2280 to 2400 $cm^{-1}$. The baseline A3 A4 is the straight line which links A3 and A4.

Next, E2 is an intersection of the perpendicular line drawn down from the peak S2 toward the wave number axis of the infrared absorption spectrum and the baseline A3 A4 . The intensity Q2 of the peak S2 is a length of segment S2E2 from S2 mentioned above to an intersection E2 of the perpendicular line drawn down from the peak S2 toward the wave number axis of the infrared absorption spectrum and the baseline.

Intensity Q3 of the peak S3 is defined as follows.

A5 is assumed as a point which shows the smallest absorbance of 2700 to 2800 $cm^{-1}$ and A6 is assumed as a point which shows the smallest absorbance of 3000 to 3100 $cm^{-1}$. The baseline A5A6 is the straight line which links A5 and A6.

Next, E3 is an intersection of the perpendicular line drawn down from the peak S3 toward the wave number axis of the infrared absorption spectrum and the baseline A5A6. The intensity Q3 of the peak S3 is a length of segment S3E3 from S3 mentioned above to an intersection E3 of the perpendicular line drawn down from the peak S3 toward the wave number axis of the infrared absorption spectrum and the baseline.

Intensity Q4 of the peak S4 is defined as follows.

A7 is assumed as a point which shows the smallest absorbance of 2500 to 3000 $cm^{-1}$ and A8 is assumed as a point which shows the smallest absorbance of 3500 to 4000 $cm^{-1}$. The baseline A7A8 is the straight line which links A7 and A8.

Next, E4 is an intersection of the perpendicular line drawn down from the peak S4 toward the wave number axis of the infrared absorption spectrum and the baseline A7A8. The intensity Q4 of the peak S4 is a length of segment S4E4 from S4 mentioned above to an intersection E4 of the perpendicular line drawn down from the peak S4 toward the wave number axis of the infrared absorption spectrum and the baseline.

An electrode for an electric double layer capacitor and an electric double layer capacitor can be obtained using the XR carbon materials of this embodiment described above. It is sufficient that these may be similar in the embodiment as described above except that the XR carbon materials described above are used in place of the carbon materials (AZC) described above, and therefore detailed description is omitted here.

The third embodiment of the present invention is an electrode for a fuel cell containing a carbon material (AZC) obtained by just carbonizing an azulmic acid as it is or by chemically modifying an azulmic acid and then carbonizing the thus modified azulmic acid.

AZC which is contained in an electrode for a fuel cell preferably has an average particle diameter (median diameter based on volume=50% D) of 0.1 μm or more and 100 μm or less, more preferably 0.5 μm or more and 30 μm or less. As for this AZC, the specific surface area measured by BET method is preferably of 30 to 2500 $m^2/g$. When the specific surface area is less than 30 $m^2/g$, supported amount of the catalyst particles tends to be short and when the specific surface area is more than 2500 $m^2/g$, synthesis thereof becomes difficult. A more preferable range of the specific surface area measured by BET method is 100 to 1500 $m^2/g$.

With regard to AZC according to this embodiment, similar material as in the first and the second embodiments described above may be used except the average particle diameter mentioned above, and therefore detailed description thereabout other than the above is omitted here.

AZC in itself can be used as an electrode but it is preferable to use it for an electrode in an embodiment of a supported catalyst which contains AZC and a metal element carried on the AZC (hereinbelow referred to as "AZC supported catalyst").

The AZC supported catalyst is a catalyst in which AZC carries at least one kind of element (hereinbelow referred to as "element X") selected from platinum group metals and the transition metal elements in the fourth to sixth period. Alternatively, the AZC supported catalyst may be a catalyst carrying a metallic compound between the platinum group metals and the transition metal elements in the fourth to sixth period. The platinum group metal includes, for example, Pt, Ru, Rh, Ir, Os and Pd. The transition metal elements in the fourth to sixth period include Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg and Sn. Among these, Pt, Ru, Ir, Mn, Fe, Co, Ni, W, V, Mo, Sn and Re are preferable.

The metallic compound between the platinum group metals and the transition metal elements in the fourth to sixth period includes Pt—Ru, Pt—Ru—Ir, Pt—Ru—Ir—Os, Pt—Ir, Pt—Mo, Pt—Fe, Pt—Co, Pt—Ni, Pt—W, Pt—Sn, Pt—Ce, Pt—Re and Rt—Cr. However, the present invention is not limited to these.

The content of the element X carried by AZC is preferably of 0.01 to 70 mass % for total amount of the AZC supported catalyst. A more preferable range of the content of the element X is 0.1 to 10 mass %.

Next, the production process of AZC supported catalyst is described.

According to this production process of the AZC supported catalyst, AZC is suspended in a solvent, and a compound including element X is added thereto to obtain a suspension, which is then subjected to reduction operation appropriately, and thus the element X is allowed to be carried on AZC.

When the element X is allowed to be carried on AZC, ordinary known methods can be followed. For example, when the element adsorbed on AZC should be carried, solid-liquid separation is performed by filtration of the above suspension. Alternatively, when the whole amount of element X should be carried on AZC, the above suspension may be removed of volatile components (dried up) thereby allowing the element X to be carried. The suspension may be made basic to deposit the component of element X followed by filtration, thereby allowing the element X to be carried. After the solid contents obtained by filtration or drying up, which carry the element X, are dried, the resultant material was subjected to a heat treatment at 100 to 900° C. in the stream containing a reducing gas such as hydrogen and ammonia thereby reducing the compound containing the element X. The temperature during this heat treatment is preferably 120 to 500° C. When this temperature is lower than 100° C., reduction tends to be hard to proceed. When this temperature is higher than 900° C., AZC becomes liable to be reduced. Instead of reducing the solid contents with hydrogen gas, the solid contents carrying the element X may be reduced in a liquid phase, sufficiently washed with pure water and filtered. Hydrazine can be used, for example, for reduction in a liquid phase. In addition, when an element X having a zero valency is contained, for example, a complex comprising phthalocyanine and the element X, reduction operation is not necessarily required but a heat treatment at 200° C. to 2,000° C., preferably at 600 to 1100° C. in an inert gas atmosphere such as nitrogen may suffice. Particularly preferably, heat treatment at 650 to 900° C. may suffice.

The AZC supported catalyst according to this embodiment is contained in an electrode for a fuel cell, and preferably it is contained in an electrode for a solid polymer fuel cell.

Next, the solid polymer fuel cell of this embodiment is described.

The solid polymer fuel cell of this embodiment comprises at least a membrane-electrode assembly (hereinbelow also referred to as "MEA") in which electrodes are bound to the each side of the proton conductive material.

Here, the electrode contained in the solid polymer fuel cell mentioned above is described for the case of using an AZC supported catalyst.

The electrode according to this embodiment comprises an AZC supported catalyst and a binder or an AZC supported catalyst and a current collector or an AZC supported catalyst and a current collector and a binder. Preferably, this electrode comprises an AZC supported catalyst and a current collector or an AZC supported catalyst and a current collector and a binder.

The binder can also serve as a water repellent material. For example, when polytetrafluoroethylene (PTFE) is used as a binder, this binder also serves as a water repellent material. In addition, a conductive material such as graphite may be added to the electrode of this embodiment.

The binder is not limited in particular as long as it can bind AZC supported catalysts with each other or an AZC supported catalyst with a current collector, and examples thereof include fluorine resins, polyolefins, polyesters, polyketones, polyethers and polysulfones. More specifically, examples of the binder include polyvinylidene fluoride, polytetrafluoroethylene, tetrafluoroethylene-hexafluoropropylene copolymer, tetrafluoroethylene-perfluoroalkylvinylether copolymer, ethylene-tetrafluoroethylene copolymer, polychlorotrifluoroethylene, ethylene-chlorotrifluoroethylene copolymer, polyvinyl fluoride, vinylidene fluoride rubbers such as vinylidene fluoride-hexafluoropropylene fluorine-containing rubber, vinylidene fluoride-hexafluoropropylene-tetrafluoroethylene fluorine-containing rubber, vinylidene fluoride-pentafluoropropylene fluorine-containing rubber, vinylidene fluoride-pentafluoropropylene-tetrafluoroethylene fluorine-containing rubber, vinylidene fluoride-perfluoromethylvinylether-tetrafluoroethylene fluorine-containing rubber, vinylidene fluoride-chlorotrifluoroethylene fluorine-containing rubber, tetrafluoroethylene-propylene fluorine-containing rubber, tetrafluoroethylene-perfluoroalkylvinylether fluorine-containing rubber, thermoplastic fluorine-containing rubbers, polyethylene, polypropylene, styrene-butadiene rubber (SBR), isoprene rubber, butadiene rubber, ethylene-acrylic acid copolymer and ethylene-methacrylic acid copolymer. These may be used singly or two or more kinds of them can be used together at any combination ratio.

The content of this binder in the electrode according to this embodiment is preferably 10 to 200 mass parts for 100 mass parts of the AZC supported catalyst and a conductive material in total. When the content is less than 10 mass parts, the electrode is liable to be difficult to form into a sheet whereas when the content is more than 200 mass parts, the binder functions as a resistance to deteriorate the cell characteristics. From the viewpoint of allowing to act as a good water repellent, fluorine resins are preferable.

It is preferable that the electrode for a fuel cell of this embodiment contains a conductive material. Examples of the conductive material include carbon black, acetylene black, graphite or oxides or nitrides which exhibit electric conductivity. Among these, preferable conductive material is carbon black, acetylene black. These may be used singly or two or more kinds of them may be used together at any combination and ratio. The content of the conductive material is preferably 1 to 20 mass %, and particularly preferably 2 to 15 mass % for carbon materials (AZC).

It is preferable for the electrode for a fuel cell of this embodiment to contain a current collector. The current collector does not only have a function of collecting electricity but also plays a role of uniformly diffusing a supplied gas (including air) to supply it to a catalytic layer. On this account, the current collector is also referred to as a gas diffusion layer. As a current collector, porous carbon paper and carbon cloth may be included. This current collector is preferably subjected to water repellent treatment.

The production process of the electrode for a fuel cell of this embodiment can be performed following the well-known method except that AZC mentioned above is used. The methods for producing these electrodes include a wet method and a dry method.

Firstly, the wet method is described.

Firstly, water is added to the AZC supported catalyst mentioned above and well stirred in the wet method. A solution of a proton conductive material and an organic solvent are further added thereto, and the resultant mixture is well stirred. After that, a conductive material is added and dispersed to prepare a slurry. The organic solvent used here consists of a single solvent or a mixture of two or more two kinds of solvent. With regard to the dispersion mentioned above, a slurry composition, which is a dispersion liquid, can be prepared using a commonly used dispersion machine (including a ball mill, a sound mil, a beads mil, a paint shaker and a nanomizer). Subsequently, the thus prepared dispersion liquid (slurry composition) is applied onto the current collector (carbon paper or carbon cloth) which has been subjected to water repellent treatment by various kinds of methods and dried and thereby to obtain an electrode for a fuel cell. At this time, the amount of the solvent in the slurry composition is preferably adjusted so that the solid content may be 5 to 60 mass %. This is because when the solid content is less than 5 mass %, coating tends to come off, while when the solid content exceeds 60 mass %, it tends to be hard to apply. It is sufficient that the water repellent treatment to the carbon paper and carbon cloth mentioned above is performed within an area where the slurry composition can be applied. In place of dispersing the proton conductive material in the slurry mentioned above, the slurry may be applied on the current collector and dried and then a solution of the proton conductive material may be applied on the dried substance.

The proton conductive material is not limited in particular as long as it can conduct a proton and a polymer having a functional group showing proton conductivity dissolved in a solvent is exemplified. Examples of the functional group showing proton conductivity include a sulfonate group, a carboxylic acid group, a phosphonic acid group and a phosphate group. In addition, examples of the backbone of the polymer mentioned above include hydrocarbon polymers such as polyolefin and polystyrene, and the backbone of perfluorocarbon polymers. Among these, perfluorocarbon polymers excellent in oxidation resistance and heat resistance are preferable. As the specific examples thereof, fluorine resins having a sulfonate group (product name "Nafion", "Flemion", "Aciplex") can be exemplified.

Next, dry method is described.

Firstly, a composition containing an AZC supported catalyst, a conductive material, a binder and a pore forming agent which serve as raw materials for producing an electrode for a fuel cell in dry method is described.

As for the AZC supported catalyst, the conductive material and the binder, it is sufficient that these are similar to those described above, and therefore detailed description thereabout is omitted here.

The pore forming agent is not limited in particular as long as it can be dissolved in an acid and an alkali, and water. Examples of the pore forming agent include lithium carbonate, ammonium carbonate, lithium fluoride, polyvinyl alcohol, polyethylene oxide, phosphotungstic acid or the salts thereof, phosphomolybdic acid or the salts thereof and ammonium chloride. But it is not limited to these.

The content of the pore forming agent in the composition is preferably 1 mass % to 50 mass %. When the content is less than 1 mass %, pore forming effect becomes difficult to appear, and the impregnation of the proton conductive material tends to be difficult. On the other hand, when this content is more than 50 mass %, the electrode becomes fragile, and the preparation of an electrode becomes difficult since the electrode is fragile during the pore forming step in the preparation of the electrode. The amount of the pore forming agent is preferably 5 to 30 mass % for the total amount of the composition.

The composition mentioned above can be obtained by adding a conductive material, a binder and a pore forming agent to the AZC supported catalyst, and the resultant mixture is kneaded with rolls to disperse the each ingredients uniformly. The mixture may be heated during kneading.

Subsequently, the composition mentioned above is applied on a net-like or porous current collector and dried to form a sheet. Alternatively, the composition mentioned above is formed into a sheet with rolls beforehand and the sheet composition may be attached to the current collector.

Then the composition in the form of a sheet is dipped in an acidic or alkaline aqueous solution to dissolve the pore forming agent and the sheet is sufficiently washed with ion-exchange water. Furthermore, the sheet composition from which the pore forming agent has dissolved is dipped in a solution having a proton conductive material dissolved therein thereby impregnating the proton conductive material into the sheet composition. After that, the solvent is evaporated and the sheet is dried to be an electrode.

Next, the proton conductive material used in the solid polymer fuel cell of this embodiment is described.

This proton conductive material is not limited in particular as long as it can conduct a proton and a polymer having a functional group showing proton conductivity is exemplified.

Examples of the functional group showing proton conductivity include a sulfonate group, a carboxylic acid group, a phosphonic acid group and a phosphate group. In addition, examples of the backbone of the polymer mentioned above include hydrocarbon polymers such as polyolefin and polystyrene, and the backbone of perfluorocarbon polymers. Among these, the perfluorocarbon polymer which was superior in oxidation resistance and heat resistance is preferable. As the specific examples thereof, fluorine resins having a sulfonate group (product name "Nafion", "Flemion", "Aciplex") can be exemplified.

MEA according to this embodiment is described next. MEA can be obtained by disposing electrodes according to this embodiment on the both sides of the proton conductive material and thermo compression bonding them with a roll or a press.

As for the condition of the thermo compression bonding to obtain MEA mentioned above, it is preferable that the temperature is 100 to 180° C., and the compression bonding is 1 minute or longer and 30 minutes or shorter with a pressure of 10 to 200 kg/cm². When the temperature is less than 100° C., the pressure is less than 10 kg/cm², or the compression bonding time is less than 1 minute, close contact is not sufficient and the resistance increases and thus cell characteristics are liable to deteriorate. On the other hand, when the temperature is more than 180° C., the pressure is more than 200 kg/cm², or the compression bonding time is more than 30 minutes, the proton conductive material is liable to deform or decompose, and significant deformation of the current collector hinders smooth supply of the fuel and the oxidizer and besides MAE is liable to be broken, and a cell characteristics tend to deteriorate.

Preferably, the electrode of this embodiment is used as a cathode electrode (oxygen reduction electrode).

The electrode for a fuel cell of this embodiment contains a carbon material which satisfies the following conditions (1), (2) and (3) (hereinbelow referred to as "XR carbon material") and may further contain a current collector and/or a binder as mentioned above.

(1) the carbon atoms, nitrogen atoms and hydrogen atoms, contained in the XR carbon material satisfy the following expressions (I) and (II):

$$(N_N/N_C) > 0.87 \times (N_H/N_C) - 0.06 \quad \text{(I)}$$

$$(N_N/N_C) > 0.01 \quad \text{(II)}$$

(2) X-ray diffraction patterns obtained by using a CuKα ray as an X-ray source have a peak at a position corresponding to a diffraction angle (2θ) of 23.5 to 25.5°; and (3) a spectrogram by laser Raman spectrometry with a wave number of 1000 to 2000 cm⁻¹ has a peak P1 between 1355 and 1385 cm⁻¹ and a peak P2 between 1550 and 1620 cm⁻¹; a most lowest point M having a smallest height L from the baseline between the peak P1 and the peak P2 ; and a ratio (L/H1) of the height L to a height H1 of 0.70 to 0.95 wherein the height H1 is a height from the baseline at the peak P1.

The conditions (1) to (3) mentioned above which define the XR carbon materials according to this embodiment are described in detail in the following.

<Concerning Condition (1)>

Concerning Condition (1), the contents of carbon atoms, nitrogen atoms and hydrogen atoms, contained in the XR carbon material is measured with a CHN analyzer.

The relation between the ratio ($N_N/N_C$) of the number of nitrogen atoms to the number of carbon atoms and the ratio ($N_H/N_C$) of the number of hydrogen atoms to the number of carbon atoms satisfies the following expression (I):

$$(N_N/N_C) > 0.87 \times (N_H/N_C) - 0.06 \quad \text{(I)}$$

This means that the XR carbon materials satisfying the condition expressed by expression (I) have an adequately small ($N_H/N_C$) and an adequately large ($N_N/N_C$). Such XR carbon materials are preferable since they have a sufficiently developed conjugate system and a further sufficiently higher nitrogen content. In the same viewpoint, the nitrogen atoms, carbon atoms and hydrogen atoms contained in the XR carbon materials preferably satisfy the condition expressed by the following expression (III) and more preferably satisfy the condition expressed by the following expression (IV):

$$(N_N/N_C) > 0.91 \times (N_H/N_C) - 0.045 \quad \text{(III)}$$

$$(N_N/N_C) > 1.0 \times (N_H/N_C) - 0.040 \quad \text{(IV)}$$

In addition, the ratio ($N_N/N_C$) of the number of nitrogen atoms to the number of carbon atoms and the ratio ($N_H/N_C$) of the number of hydrogen atoms to the number of carbon atoms in the XR carbon materials of this embodiment preferably satisfy the condition expressed by the following expression (V), more preferably satisfy the condition expressed by the following expression (VI) and particularly preferably satisfy the condition expressed by the following expression (VII):

$$(N_N/N_C) < 1.2 \times (N_H/N_C) + 0.15 \quad \text{(V)}$$

$$(N_N/N_C) < 1.2 \times (N_H/N_C) + 0.08 \quad \text{(VI)}$$

$$(N_N/N_C) < 1.2 \times (N_H/N_C) + 0.01 \quad \text{(VII)}$$

The ratio ($N_H/N_C$) of the number of hydrogen atoms to the number of carbon atoms in the XR carbon materials of this embodiment is preferably 0.01 to 0.5, more preferably 0.05 to 0.40 and still more preferably 0.05 to 0.35 and particularly preferably 0.05 to 0.15.

The ($N_H/N_C$) not more than 0.5 is preferable since it means the material has a further sufficiently developed conjugate system and the ($N_H/N_C$) not less than 0.01 is preferable since it means a relatively higher nitrogen content.

The ratio ($N_N/N_C$) of the number of nitrogen atoms to the number of carbon atoms in the XR carbon materials of this embodiment is preferably 0.01 or more, more preferably 0.03 to 1.0 and still more preferably 0.05 to 0.7 and particularly preferably 0.08 to 0.4, and extremely preferably 0.3 to 0.4. When the ($N_N/N_C$) is within this numerical value range, the nitrogen content can be adequately high and the production cost of XR carbon materials can be further controlled.

The XR carbon materials according to this embodiment may contain elements other than carbon atom, nitrogen atom and hydrogen atom. The content of the other elements is preferably 15 mass % or less, more preferably 7 mass % or less and particularly preferably 3 mass % or less for 100 mass % of the XR carbon materials according to this embodiment.

<Concerning Condition (2)>

Concerning Condition (2), it is preferable that X-ray diffraction patterns of the XR carbon materials obtained by using a CuKα ray as an X-ray source have a peak at a position corresponding to a diffraction angle (2θ) of 23.5 to 25.5°. The X-ray diffraction patterns more preferably have a peak at a position corresponding to a diffraction angle (2θ) of 23.7 to 25.0°, and still more preferably have a peak at a position corresponding to a diffraction angle (2θ) of 23.9 to 24.5°. It is preferable that the peak has the maximum intensity at the diffraction angle (2θ) of 15 to 50°. The XR carbon materials according to this embodiment have a layered structure. The preferable distance between the layers is equivalent to 3.49 to 3.78 angstrom, and the more preferable distance between layers is equivalent to 3.56 to 3.75 angstrom, and the still more preferable distance between layers is equivalent to 3.64 to 3.72 angstrom.

<Concerning Condition (3)>

Concerning Condition (3), a spectrogram by laser Raman spectrometry of the XR carbon materials according to this embodiment with a wave number of 1000 to 2000 cm$^{-1}$ preferably has a peak P1 between 1355 and 1385 cm$^{-1}$ and a peak P2 between 1550 and 1620 cm$^{-1}$. The spectrogram may have at least two main peaks, i.e., the above-mentioned peak P1 and peak P2 . In this spectrogram, it is more preferable to have the peak P1 between 1360 cm$^{-1}$ and 1380 cm$^{-1}$ and the peak P2 between 1570 cm$^{-1}$ and 1585 cm$^{-1}$.

In the spectrogram by laser Raman spectrometry of the XR carbon materials according to this embodiment, the ratio (L/H1) mentioned below is preferably 0.70 to 0.95, more preferably 0.86 to 0.93 and particularly preferably 0.88 to 0.91. The ratio of (L/H1) in the spectrogram by the laser Raman spectrometry of the XR carbon materials according to this embodiment as used herein is a value in conjunction with the half bandwidth of the peak (P1). If the half bandwidth decreases, the value of (L/H1) decreases, and if the half bandwidth increases, the value of (L/H1) increases. Although (L/H1) is used as an index of the half bandwidth here in this embodiment, the half bandwidth can be measured by performing peak resolution. The peak resolution can be performed with well-known methods such as those using Lorentz function and Gauss function. It is readily understood for those skilled in the art that a function showing a high fitting factor may be adequately used for peak resolution.

In a spectrogram by the laser Raman spectrometry of XR carbon materials according to this embodiment, the half bandwidth of the peak P1 is preferably 200 to 400 cm$^{-1}$, more preferably 250 to 350 cm$^{-1}$ and particularly preferably 270 to 320 cm$^{-1}$.

In the spectrogram by laser Raman spectrometry of the XR carbon materials according to this embodiment, the ratio (L/H2 ) mentioned below is preferably 0.60 to 0.90, more preferably 0.63 to 0.85 and particularly preferably 0.75 to 0.84. The ratio of (L/H2 ) in the spectrogram by the laser Raman spectrometry of the XR carbon materials according to this embodiment as used herein is a value in conjunction with the half bandwidth of the peak (P2 ). If the half bandwidth decreases, the value of (L/H2 ) decreases, and if the half bandwidth increases, the value of (L/H2 ) increases. Although (L/H2 ) is used as an index of the half bandwidth here in this embodiment, the half bandwidth can be measured by performing peak resolution. The peak resolution can be performed with well-known methods such as those using Lorentz function and Gauss function. It is readily understood for those skilled in the art that a function showing a high fitting factor may be adequately used for peak resolution.

In a spectrogram by the laser Raman spectrometry of XR carbon materials according to this embodiment, the half bandwidth of the peak P2 is preferably 30 to 200 cm$^{-1}$, more preferably 80 to 170 cm$^{-1}$ and particularly preferably 100 to 150 cm$^{-1}$.

The above-mentioned peaks P1 and P2 are main two peaks between 1340 cm$^{-1}$ and 1620 cm$^{-1}$ of the Raman shift in the spectrogram by the laser Raman spectrometry and the peak P1 is a peak between 1355 cm$^{-1}$ and 1385 cm$^{-1}$ and the peak P2 is a peak between 1550 cm$^{-1}$ and 1620 cm$^{-1}$.

In this embodiment, the peak intensity is measured from the spectrogram by the laser Raman spectrometry which is obtained by performing measurement with an Ar laser (wavelength 540 nm, 2 mW) at a beam size of 5μ, scanning range of 1000 to 2000 cm$^{-1}$ and accumulation time of 5 minutes.

FIG. 2 is a schematic view of an example of the spectrogram by the laser Raman spectrometry of the XR carbon material according to this embodiment. FIG. 2 is a graph to explain the ratio of (L/H1) and the ratio of (L/H2 ) to be used in this embodiment, and this is not at all to limit the spectrogram by laser Raman spectrometry obtained from XR carbon materials according to this embodiment.

Firstly the baseline for the Raman shift of 1000 to 2000 cm$^{-1}$ is determined. B1 is the smallest intensity value of 1000 to 1300 cm$^{-1}$ and B2 is the smallest intensity value of 1700 to 2000 cm$^{-1}$ as shown in FIG. 2. The baseline in the spectrogram by the laser Raman spectrometry to be used in this embodiment is the straight line that passes through both B1 and B2.

Next, C1 and C2 shown in FIG. 2 are intersections of the perpendicular lines drawn down from the peaks P1 and P2 toward the Raman shift axis and the baseline, respectively.

D is an intersection of the perpendicular line drawn down from a minimum point M having the lowest height from the baseline between the peaks P1 and P2 toward the Raman shift axis and the baseline. The height L of the minimum point M is a length from the minimum point M to the intersection D, and specifically it is the length of segment MD in the spectrogram illustrated in FIG. 2.

In the meantime, the height H1 is a length from the peak P1 to the C1 which is an intersection of the perpendicular line drawn down from the peak P1 toward the Raman shift axis and the baseline. The length of segment P1C1 is equivalent to the height H1 in the spectrogram illustrated in FIG. 2. The height H2 is a length from the peak P2 to an intersection of the perpendicular line toward the Raman shift axis and the baseline. The length of segment P2C2 is equivalent to the height H2 in the spectrogram illustrated in FIG. 2.

It is preferable that the XR carbon materials according to this embodiment have peaks at 401.0±0.3 eV and 398.0±0.5 eV in XPS spectrogram of N1s determined by X-ray photoelectron spectroscopy analysis (XPS). It is more preferable to have peaks at 401.0±0.2 eV and 398.0±0.3 eV, and it is particularly preferable to have peaks at 401.0±0.1 eV and 398.0±0.1 eV. Here in XPS spectrogram of N1s, the peak around 401 eV corresponds to Center type and Valley-shaped nitrogen atom; the peak around 398 eV corresponds to the nitrogen atom of Top type (for example, see Carbon, vol. 40, pp. 597-608 (2002)). That is, the spectrogram having the above-mentioned peaks in XPS spectrogram of N1s means that nitrogen atoms are present as a quaternary nitrogen or pyridine nitrogen in the surface or the edge of the carbon network. The XR carbon materials according to this embodiment preferably contain a nitrogen atom in such a condition. The XPS is a spectrum obtained under the conditions of X-ray source: Al tube (Al-Kα ray), tube voltage: 15 kV, tube current: 10 mA, analysis area: 600 m×300 μm oval area, uptake area: N1s, C1s, Pass-Energy: 20 eV and defined as values when measured with energy calibration at a peak position of C1s.

As for the XR carbon materials according to this embodiment, the wave number which gives the maximum absorption peak intensity within the wave number of 1500 to 1800 cm$^{-1}$ is preferably have a maximum peak in 1550 to 1640 cm$^{-1}$ in the infrared spectrum chart. In addition, it is preferable that as for the XR carbon materials according to this embodiment, the ratio (Q2/Q1) of the intensity Q2 at the absorbance peak S2 within the wave number of 2200 to 2280 cm$^{-1}$ to the intensity Q1 at the absorbance peak S1 within the wave number of 1550 to 1640 cm$^{-1}$ in the infrared spectrum chart is not more than 0.07. This intensity ratio (Q2/Q1) is preferably not more than 0.05, and particularly preferably not more than 0.02. The absorbance peak within the wave number of 2200 to 2280 cm$^{-1}$ is a peak derived from a nitrile group, and this peak intensity is preferably weak, that is, fewer nitrile groups are preferable.

Besides, it is preferable that as for the XR carbon materials according to this embodiment, the ratio (Q3/Q1) of the intensity Q3 at the absorbance peak S3 within the wave number of 2800 to 3000 cm$^{-1}$ to the intensity Q1 at the absorbance peak S1 within the wave number of 1550 to 1640 cm$^{-1}$ in the infrared spectrum chart is not more than 0.10. This intensity ratio (Q2/Q1) is preferably not more than 0.05, and particularly preferably not more than 0.02. The absorbance peak within the wave number of 2800 to 3000 cm$^{-1}$ is a peak derived from a C—H group, and this peak intensity is preferably weak, that is, fewer C—H groups are preferable.

In addition, it is preferable that as for the XR carbon materials according to this embodiment, the ratio (Q4/Q1) of the intensity Q4 at the absorbance peak S4 within the wave number of 3000 to 3500 cm$^{-1}$ to the intensity Q1 at the absorbance peak S1 within the wave number of 1550 to 1640 cm$^{-1}$ in the infrared spectrum chart is not more than 0.80. This intensity ratio (Q4/Q1) is preferably not more than 0.70, and particularly preferably not more than 0.6. The absorbance peak within the wave number of 3000 to 3500 cm$^{-1}$ is a peak derived from an N—H group or an O—H group, and this peak intensity is preferably weak, that is, fewer N—H groups or O—H groups are preferable.

The peak intensity in the chart of infrared absorption spectrum is defined as follows.

Intensity Q1 of the peak S1 is defined as follows.

A1 is assumed as a point which shows the smallest absorbance of 1000 to 1200 cm$^{-1}$ and A2 is assumed as a point which shows the smallest absorbance of 1700 to 1900 cm$^{-1}$. The baseline A1A2 is the straight line which links A1 and A2.

Next, E1 is an intersection of the perpendicular line drawn down from the peak S1 toward the wave number axis of the infrared absorption spectrum and the baseline A1 A2. The intensity Q1 of the peak S1 is a length of segment S1E1 from S1 mentioned above to an intersection E1 of the perpendicular line drawn down from the peak S1 toward the wave number axis of the infrared absorption spectrum and the baseline.

Intensity Q2 of the peak S2 is defined as follows.

A3 is assumed as a point which shows the smallest absorbance of 2100 to 2200 cm$^{-1}$ and A4 is assumed as a point which shows the smallest absorbance of 2280 to 2400 cm$^{-1}$. The baseline A3A4 is the straight line which links A3 and A4.

Next, E2 is an intersection of the perpendicular line drawn down from the peak S2 toward the wave number axis of the infrared absorption spectrum and the baseline A3A4 . The intensity Q2 of the peak S2 is a length of segment S2E2 from S2 mentioned above to an intersection E2 of the perpendicular line drawn down from the peak S2 toward the wave number axis of the infrared absorption spectrum and the baseline.

Intensity Q3 of the peak S3 is defined as follows.

A5 is assumed as a point which shows the smallest absorbance of 2700 to 2800 cm$^{-1}$ and A6 is assumed as a point which shows the smallest absorbance of 3000 to 3100 cm$^{-1}$. The baseline A5A6 is the straight line which links A5 and A6.

Next, E3 is an intersection of the perpendicular line drawn down from the peak S3 toward the wave number axis of the infrared absorption spectrum and the baseline A5A6. The intensity Q3 of the peak S3 is a length of segment S3E3 from S3 mentioned above to an intersection E3 of the perpendicular line drawn down from the peak S3 toward the wave number axis of the infrared absorption spectrum and the baseline.

Intensity Q4 of the peak S4 is defined as follows.

A7 is assumed as a point which shows the smallest absorbance of 2500 to 3000 cm$^{-1}$ and A8 is assumed as a point which shows the smallest absorbance of 3500 to 4000 cm$^{-1}$. The baseline A7A8 is the straight line which links A7 and A8.

Next, E4 is an intersection of the perpendicular line drawn down from the peak S4 toward the wave number axis of the infrared absorption spectrum and the baseline A7A8. The intensity Q4 of the peak S4 is a length of segment S4E4 from S4 mentioned above to an intersection E4 of the perpendicular line drawn down from the peak S4 toward the wave number axis of the infrared absorption spectrum and the baseline.

An electrode for a fuel cell and a fuel cell of this embodiment can be obtained using XR carbon materials described above of this embodiment. These may be similar in the embodiment as described above except that the XR carbon materials are used in place of the carbon materials (AZC) described above, and therefore detailed description is omitted here.

According to the embodiments of the present invention described above, electrodes for lithium ion secondary batteries, electrodes for electric double layer capacitors and electrodes for fuel cells can be provided by relatively simple production processes requiring few resources and little energy consumption. The electrodes for lithium ion secondary batteries according to the first embodiment described above are high in charge/discharge capacity, high in rate characteristics and excellent in cycle characteristics and besides good in balance of these battery characteristics and excellent in storage stability. In addition, since the high rate characteristics are maintained even if the carbon materials are thickly applied to the electrode, the lithium ion secondary batteries are excellent in high rate characteristics while satisfying capacity requirement per unit volume and thus they are extremely advantageous. Furthermore, since the carbon materials obtained from an azulmic acid according to the first embodiment keep the above-mentioned performance as high even they are stored and crushed in the air, they are advantageous for the production process of electrodes for lithium ion secondary batteries and lithium ion secondary batteries comprising the electrodes.

In addition, according to the second embodiment mentioned above, capacitance per surface area of an electric double layer capacitor increases. Furthermore, since the capacitance per volume is large, capacitance per unit volume can be increased in these electric double layer capacitors and thus they are useful. Besides, the electric double layer capacitor of this embodiment shows a cyclic voltammogram in a good rectangle form and an ideal capacitor behavior, and thus it can be an ideal capacitor with a good balance in the capacitance and the behavior.

Furthermore, according to the third embodiment described above, the electrode for a fuel cell has a high oxygen reduction activity, the electrodes for fuel cells and the fuel cells comprising the electrodes are useful.

And the carbon materials of the electrode of the embodiment of the present invention can be produced by heat-treating an azulmic acid which is obtained by polymerizing hydrogen cyanide obtained as a byproduct when acrylonitrile is produced from propylene and propane as well as hydrogen cyanide obtained from methane. Since this production process has few numbers of steps, and can give carbon materials in high yield, it is a production process which is resource saving and energy saving. Therefore, the electrodes obtained from these carbon materials are efficient and inexpensive and besides they can be produced with saved resources and energy, they are industrially very useful.

EXAMPLES

The present invention will now be described in further detail in reference to Examples and the like, but these are illustrative only and the present invention is not limited to the following specific examples. Various changes may be made to the Examples shown below by those skilled in the art to implement the present invention, and these changes are encompassed in the scope of the claims of the present invention.

Methods of analysis in Examples and Comparative Examples are described below.

<Methods of Analysis>
(CHN Analysis)

The CHN analysis was carried out by using MICRO CORDER JM10 (product name) CHN analyzer manufactured by J-Science Lab Co., Ltd. and filling 2,500 μg of a sample in a sample holder. A sample furnace, a combustion furnace (copper oxide catalyst), and a reduction furnace (composed of silver particles+copper oxide zone, a reduced copper zone, and a copper oxide zone) were set at 950° C., 850° C., and 550° C., respectively. Oxygen and He were flowed in the furnace and the flow rate of oxygen was set at 15 ml/min and the flow rate of He was set at 150 ml/min. TCD was used for the detector of each element. Antipyrine was used for calibration according to a method described in the manual.

(Method for Measuring Laser Raman Spectrum)

A sample was milled in an agate mortar and mounted in a cell for powder, and the laser Raman spectrum of the sample was measured under the following conditions:

Instrument: "System-3000" (product name) laser Raman spectrometer manufactured by Renishaw Corporation
Light source: Ar laser (wavelength of 540 nm, 2 mW)
Beam size: 5μ
Operation range: 1,000 to 2,000 $cm^{-1}$
Accumulation time: 5 minutes.

(Method for Measuring X-Ray Diffraction)

A sample was milled in an agate mortar and filled in a cell for powder, and the X-ray diffraction pattern of the sample was measured under the following conditions:

Instrument: "Rint 2500" (product name) X-ray diffractometer manufactured by Rigaku Corporation
X-ray source: Cu tube (Cu-Kα ray)
Tube voltage: 40 kV
Tube current: 200 mA
Dispersive crystal: used
Scattering slit: 1°
Divergence slit: 1°
Light-receiving slit: 0.15 mm
Scan rate: 2°/min
Sampling width: 0.02°
Scanning method: 2θ/θ method.

Correction of the X-ray diffraction angle (2θ) was performed using the data of the X-ray diffraction angle obtained for silicon powder.

(Method for Measuring X-Ray Photoelectron Spectroscopy (XPS))

A sample was milled in an agate mortar and filled in a cell for powder, and the XPS spectrum of the sample was measured under the following conditions:

Instrument: "ESCALAB 250" (product name) X-ray photoelectron spectrometer manufactured by Thermo Electron Co., Ltd.
X-ray source: Al tube (Al-Kα ray)
Tube voltage: 15 kV
Tube current: 10 mA
Analysis area: 600 μm×300 μm oval
Capture area: N1s and C1s
Pass-Energy: 20 eV.

The obtained spectrum was corrected for energy using the peak location of C1s.

(Method for Measuring IR Spectrum)

IR spectrum was measured under conditions of a transmission method, MCT detection, and a resolution of 4 $cm^{-1}$ using "FTS 575C/UMA 500" (product name) FT-I spectrometer manufactured by Variant Corporation. A sample powder is mixed with KBr powder to obtain the sample concentration (about 100-fold) in which the spectrum can be easily measured and mixed powder was tableted at a pressing pressure of 200 kg/$cm^2$ for sample preparation.

(Method for Measuring Particle Size Distribution and Average Particle Diameter)

Particle size distribution was measured using "Microtrac MT3300" (product name) laser diffraction-type particle size analyzer manufactured by Nikkiso Co., Ltd., and the average particle diameter (50% D) was determined from the result.

(Method for Measuring Specific Surface Area)

After the sample was vacuum degassed at 300° C. for 8 hours, adsorbed amount of nitrogen to the sample was measured using "AUTOSORB-3-MP" (product name) gas adsorption amount measuring apparatus manufactured by Yuasa Ionics Inc. The adsorption isotherm of nitrogen at the liquid nitrogen temperature was created and the specific surface area of the sample was determined therefrom.

(Method for Measuring Bulk Density)

About 3 g of the carbon material was poured from medical paper into a glass vessel having an inner diameter of 15 mm and the powder was tapped 10 times and the bulk density was measured from the filling height and the filling mass at that time.

<Preparation of Azulmic Acid>

An aqueous solution in which 150 g of hydrogen cyanide is dissolved in 350 g of water was prepared and 120 g of 25% ammonia aqueous solution was added to this aqueous solution for 10 minutes while the aqueous solution was stirred, and the resultant mixed solution was heated to 35° C. Polymerization of hydrogen cyanide started and a blackish brown polymer began to deposit, and the temperature elevated slowly to 45° C. 30 mass % hydrogen cyanide aqueous solution was added at a rate of 200 g/h from 2 hours later after the polymerization started for 4 hours. The aqueous solution was cooled and controlled so that the reaction temperature was maintained at 50° C. during the addition of the hydrogen cyanide aqueous solution. The cooling was stopped after the addition of the hydrogen cyanide aqueous solution ended, and then the temperature elevated to 90° C., and after the temperature remained at this temperature for about 1 hour, the temperature descended slowly. After that, the reaction was performed as it is for 100 hours. The resultant black sediment was separated by filtration. The yield of the sediment at this time was 97% for the total amount of the used hydrogen cyanide. After the separated sediment was washed with water and dried in a dryer at 120° C. for 5 hours and black azulmic acid was obtained.

<Electrode for Lithium Ion Secondary Battery>

The preparation process of the electrode (negative electrode) for a lithium ion secondary battery, the preparation process of the lithium ion secondary battery, and measuring method of the characteristics of the lithium ion secondary battery are as follows.

(Method of Preparing Negative Electrode for Lithium Ion Secondary Battery)

Polyvinylidene fluoride (binder) was dissolved in N-methyl-2-pyrrolidone to prepare a 5 mass % solution and to this were added acetylene black (conductive material) and then a carbon material to prepare a negative electrode mixture in the form of a slurry. The viscosity of the slurry was adjusted by adding N-methyl-2-pyrrolidone appropriately at this time. The mass ratio of the carbon material, acetylene black and the polyvinylidene fluoride was set so that carbon material:acetylene black:polyvinylidene fluoride=90:5:5.

The obtained negative electrode mixture was applied on a copper foil (current collector) with a doctor blade. Then the mixture was vacuum dried at 80° C. for 24 hours. After the vacuum drying, it was compressed and formed by passing the article through roll press, and negative electrodes were punched out in a size of 12 mm in diameter.

The mass of the carbon material and the density of the carbon material were calculated by the following formulas.

(Mass of carbon material)=(mass of negative electrode)−(mass of copper foil)−(mass of binder)−(mass of conductive material)

(Density of carbon material)=(mass of carbon material)/(electrode area)

The electrode area was 1.13 cm² here.

(Method for Preparing Lithium Ion Secondary Battery)

The negative electrode prepared by the method of preparing an electrode described above was used as a working electrode in an atmosphere whose dew point was −70° C. or less. A lithium metal counter electrode was used as a counter electrode and 1M-LiPF$_6$ electrolyte containing a mixture of 1/1 ethylene carbonate (EC)/dimethyl carbonate (DMC) as a solvent was used as an electrolyte liquid and a polypropylene film with fine pores (Celgard3501) was used as a separator. A lithium ion secondary battery for use in testing was thus prepared using HS cell (manufactured by Housen Corporation) as a cell.

(Method for Measuring Discharge Capacity)

Charging was performed using a carbon material as a working electrode up to 0.01 V against the lithium metal counter electrode at a current density of 1 mA/cm², and further charging was performed at a constant voltage of 0.01 V until the current value reached 0.02 mA/cm² to dope the negative electrode with lithium. After that, discharging was performed at a current density of 1 mA/cm² down to 2 V against the lithium counter electrode and further discharging was performed at a constant voltage of 2 V until the current value reached 0.02 mA/cm² and thus the discharge capacity was measured (measurement by CC-CV method wherein CC and CV are abbreviations of constant current and constant voltage, respectively).

(Method for Measuring Cycle Characteristics and High Rate Characteristic)

Charging was performed using a carbon material as a working electrode at a current of 0.04 A/g per mass of the carbon material against the lithium counter electrode up to 0.001 V to dope the negative electrode with lithium. Then, discharging was performed at the same current as in charging and cut off operation was performed at 3 V (measurement by CC method). This operation was repeated 5 times. Subsequently, charging and discharging were repeated 5 times except that the current per mass of the carbon material was changed to 0.08 A/g (10 cycles of charge/discharge in accumulated total). Subsequently, charging and discharging were repeated 5 times except that the current per mass of the carbon material was changed to 0.2 A/g (15 cycles of charge/discharge in accumulated total). Subsequently, charging and discharging were repeated 5 times except that the current per mass of the carbon material was changed to 0.4 A/g (20 cycles of charge/discharge in accumulated total). Subsequently, charging and discharging were repeated 5 times except that the current per mass of the carbon material was changed to 0.8 A/g (25 cycles of charge/discharge in accumulated total). Subsequently, charging and discharging were repeated 5 times except that the current per mass of the carbon material was changed to 1.2 A/g (30 cycles of charge/discharge in accumulated total). Subsequently, charging and discharging were repeated 5 times resuming the current to the initial value of 0.04 A/g (35 cycles of charge/discharge in accumulated total).

The cycle characteristics were determined by comparing the discharge capacity at the time of the 5th accumulated cycle when charging and discharging were performed at a current of 0.04 A/g and the discharge capacity at the time of the 35th accumulated cycle when charging and discharging were performed at a current of 0.04 A/g.

In the meantime, the high rate characteristics were determined from the discharge capacity at a current of 1.2 A/g (at the time of the 30th accumulated cycle).

Example 1

12 g of the azulmic acid obtained as above was sampled and filled in a quartz tube having an inner diameter of 25 mm. The temperature of this azulmic acid was elevated to 1000° C. over 70 minutes in a nitrogen gas flow of 300 Ncc/min under atmospheric pressure, and held at 1000° C. for 1 hour for carbonization to obtain a carbon material (AZC). The oxygen concentration in the nitrogen gas used was found to be 1 ppm as a result of measurement using a trace oxygen analyzer WA-type, manufactured by Teledyne Analytical Instruments).

<Analysis of Carbon Material>

(Results of CHN Analysis)

In the obtained AZC, the number ratio of nitrogen atoms to carbon atoms ($N_N/N_C$) was 0.085 and the number ratio of hydrogen atoms to carbon atoms ($N_H/N_C$) was 0.10.

(Results of Measurement of Laser Raman Spectrum)

The obtained AZC had peaks around 1382 cm$^{-1}$ (P1) and around 1585 cm$^{-1}$ (P2) in the range from 1000 to 2000 cm$^{-1}$ and had a ratio of (L/H1) of 0.88.

(Results of Measurement of X-Ray Diffraction)

The obtained AZC had main peaks around 24.1° and also a peak around 44.3° in the range between 5° and 50°. This revealed that the AZC had a layered structure with a large distance between layers. Besides, it was found that the AZC had a layered structure from the whole patterns of the X-ray diffraction.

(Measurement of X-Ray Photoelectron Spectroscopy (XPS))

The obtained AZC had peaks at 398.0 eV and 401.0 eV in the range from 392 to 410 eV.

(Results of Measurement of IR Spectrum)

The obtained AZC had the maximum of the peak intensities of absorbance in a wavenumber range of 1500 cm$^{-1}$ to 1800 cm$^{-1}$ at a wavenumber of 1612 cm$^{-1}$, the Q2 peak and the Q3 peak were not observed and the ratios (Q2/Q1) was not more than 0.01 and (Q3/Q1) was not more than 0.01. (Q4/Q1) was 0.47.

<Pulverization and Classification of AZC>

The obtained AZC was pulverized and classified to obtain AZC having an average particle diameter of about 12 μm and this was used for the preparation of a negative electrode. In the Examples of the present invention, storage, pulverization and storage after pulverization were all performed in the air.

<Preparation of Negative Electrode for Lithium Ion Secondary Battery>

A negative electrode for a lithium ion secondary battery was prepared according to the method of preparing a negative electrode for a lithium ion secondary battery described above. The density of the carbon material for the negative electrode was adjusted to 3.6 mg/cm$^2$ by the amount of the solvent and the thickness of the doctor blade.

<Preparation of the Lithium Ion Secondary Battery>

A lithium ion secondary battery was prepared according to the method of preparing a lithium ion secondary battery described above.

<Measurement of Discharge Capacity>

The discharge capacity was measured according to the method for measuring the discharge capacity described above. The results are shown in Table 1.

<Measurement of Cycle Characteristics>

The cycle characteristics were measured according to the method for measuring the cycle characteristics described above. The results are shown in Table 1.

<Measurement of High Rate Characteristics>

The high rate characteristics were measured according to the method for measuring the high rate characteristics described above. The results are shown in Table 1.

Example 2

A negative electrode for a lithium ion secondary battery was prepared using the AZC obtained by <Pulverization and classification of AZC> in Example 1 according to the preparation process of a negative electrode for a lithium ion secondary battery described above. The density of the carbon material for the negative electrode was adjusted to 6.4 mg/cm$^2$ by the amount of the solvent and the thickness of the doctor blade.

<Preparation of the Lithium Ion Secondary Battery>

A lithium ion secondary battery was prepared according to the method of preparing a lithium ion secondary battery described above.

<Measurement of Discharge Capacity>

The discharge capacity was measured according to the method for measuring the discharge capacity described above. The results are shown in Table 1.

<Measurement of Cycle Characteristics>

The cycle characteristics were measured according to the method for measuring the cycle characteristics described above. The results are shown in Table 1.

<Measurement of High Rate Characteristics>

The high rate characteristics were measured according to the method for measuring the high rate characteristics described above. The results are shown in Table 1.

The comparison between Example 1 and Example 2 shows that high rate characteristics are not deteriorated when the capacity as a battery is increased, due to the characteristics that high rate characteristics are maintained even if the active material (carbon material) is thickly applied on the negative electrode and therefore the material was very advantageous.

Example 3

12 g of the azulmic acid obtained as above was sampled and filled in a quartz tube having an inner diameter of 25 mm. The temperature of this azulmic acid was elevated to 900° C. over 50 minutes in a nitrogen gas flow of 300 Ncc/min under atmospheric pressure, and held at 900° C. for 1 hour for carbonization to obtain a carbon material (AZC). The oxygen concentration in the nitrogen gas used was found to be 1 ppm as a result of measurement using a trace oxygen analyzer (306WA-type, manufactured by Teledyne Analytical Instruments).

<Analysis of Carbon Material>

(Results of CHN Analysis)

In the obtained AZC, the number ratio of nitrogen atoms to carbon atoms ($N_N/N_C$) was 0.18 and the number ratio of hydrogen atoms to carbon atoms ($N_H/N_C$) was 0.19.

(Results of Measurement of Laser Raman Spectrum)

The obtained AZC had peaks around 1368 cm$^{-1}$ (P1) and around 1577 cm$^{-1}$ (P2) in the range from 1000 to 2000 cm$^{-1}$ and had a ratio of (L/H1) of 0.87.

(Results of Measurement of X-Ray Diffraction)

The obtained AZC had main peaks around 24.4° and also a peak around 44.7° in the range between 5° and 50°. It was found that the AZC had a layered structure from the whole patterns of the X-ray diffraction.

(Results of Measurement of X-Ray Photoelectron Spectroscopy (XPS))

The obtained AZC had peaks at 398.0 eV and 400.9 eV in the range from 392 to 410 eV.

(Results of Measurement of IR Spectrum)

The obtained AZC had the maximum of the peak intensities of absorbance in a wavenumber range of 1500 cm$^{-1}$ to 1800 cm$^{-1}$ at a wavenumber of 1612 cm$^{-1}$, the Q2 peak and the Q3 peak were not observed and the ratios (Q2/Q1) was not more than 0.01 and (Q3/Q1) was not more than 0.01. (Q4/Q1) was 0.48.

<Pulverization and Classification of AZC>

The obtained AZC was pulverized and classified to obtain AZC having an average particle diameter of about 12 µm and this was used for the preparation of a negative electrode.

<Preparation of Negative Electrode for Lithium Ion Secondary Battery>

A negative electrode for a lithium ion secondary battery was prepared according to the method of preparing a negative electrode for a lithium ion secondary battery described above. The density of the carbon material for the negative electrode was adjusted to 3.6 mg/cm$^2$ by the amount of the solvent and the thickness of the doctor blade.

<Preparation of the Lithium Ion Secondary Battery>

A lithium ion secondary battery was prepared according to the method of preparing a lithium ion secondary battery described above.

<Measurement of Discharge Capacity>

The discharge capacity was measured according to the method for measuring the discharge capacity described above. The results are shown in Table 1.

<Measurement of Cycle Characteristics>

The cycle characteristics were measured according to the method for measuring the cycle characteristics described above. The results are shown in Table 1.

<Measurement of High Rate Characteristics>

The high rate characteristics were measured according to the method for measuring the high rate characteristics described above. The results are shown in Table 1.

Example 4

A negative electrode for a lithium ion secondary battery was prepared using the AZC obtained by <Pulverization and classification of AZC> in Example 1 after stored in the air for 2 months according to the method of preparing a negative electrode for a lithium ion secondary battery described above. The density of the carbon material for the negative electrode was adjusted to 3.6 mg/cm² by the amount of the solvent and the thickness of the doctor blade.

<Preparation of the Lithium Ion Secondary Battery>

A lithium ion secondary battery was prepared according to the method of preparing a lithium ion secondary battery described above.

<Measurement of Discharge Capacity>

The discharge capacity was measured according to the method for measuring the discharge capacity described above. The results are shown in Table 1.

<Measurement of Cycle Characteristics>

The cycle characteristics were measured according to the method for measuring the cycle characteristics described above. The results are shown in Table 1.

<Measurement of High Rate Characteristics>

The high rate characteristics were measured according to the method for measuring the high rate characteristics described above. The results are shown in Table 1.

The comparison between Example 1 and Example 4 shows that the negative electrode of the present invention is excellent in storage stability in the air.

Comparative Example 1

<Preparation of the Negative Electrode for Lithium Ion Secondary Battery>

A negative electrode for a lithium ion secondary battery was prepared using graphite ("HQB12" (product name) manufactured by Hydro-Quebec Corporation, average particle diameter: about 12 μm) as a carbon material according to the method of preparing a negative electrode for a lithium ion secondary battery described above. The density of the carbon material for the negative electrode was adjusted to 3.6 mg/cm² by the amount of the solvent and the thickness of the doctor blade.

<Analysis of Carbon Material>

(Results of Measurement of X-Ray Diffraction)

The carbon material mentioned above did not have a peak in the position of 23.5° to 25.5° and had a main peak at the position of 26.5°.

<Preparation of the Lithium Ion Secondary Battery>

A lithium ion secondary battery was prepared according to the method of preparing a lithium ion secondary battery described above.

<Measurement of Discharge Capacity>

The discharge capacity was measured according to the method for measuring the discharge capacity described above. The results are shown in Table 1.

<Measurement of Cycle Characteristics>

The cycle characteristics were measured according to the method for measuring the cycle characteristics described above. The results are shown in Table 1.

<Measurement of High Rate Characteristics>

The high rate characteristics were measured according to the method for measuring the high rate characteristics described above. The results are shown in Table 1.

Comparative Example 2

12 g of petroleum pitch having a softening point of 210° C. and H/C atom ratio of 0.63 was sampled and filled in a quartz tube having an inner diameter of 25 mm. The temperature of this petroleum pitch was elevated to 1000° C. over 70 minutes in a nitrogen gas flow of 300 Ncc/min under atmospheric pressure, and held at 1000° C. for 1 hour for carbonization to obtain a carbon material. The oxygen concentration in the nitrogen gas used was found to be 1 ppm as a result of measurement using a trace oxygen analyzer (306WA-type, manufactured by Teledyne Analytical Instruments).

<Analysis of Carbon Material>

(Results of CHN Analysis)

In the obtained carbon material, the number ratio of nitrogen atoms to carbon atoms ($N_N/N_C$) was not more than 0.001 and the number ratio of hydrogen atoms to carbon atoms ($N_H/N_C$) was 0.11.

<Pulverization and Classification of Carbon Material>

The obtained carbon material was pulverized and classified to obtain a carbon material having an average particle diameter of about 12 μm and this was used for the preparation of a negative electrode.

<Preparation of Negative Electrode for Lithium Ion Secondary Battery>

A negative electrode for a lithium ion secondary battery was prepared according to the method of preparing a negative electrode for a lithium ion secondary battery described above. The density of the carbon material for the negative electrode was adjusted to 3.6 mg/cm² by the amount of the solvent and the thickness of the doctor blade.

<Preparation of the Lithium Ion Secondary Battery>

A lithium ion secondary battery was prepared according to the method of preparing a lithium ion secondary battery described above.

<Measurement of Discharge Capacity>

The discharge capacity was measured according to the method for measuring the discharge capacity described above. The results are shown in Table 1.

<Measurement of Cycle Characteristics>

The cycle characteristics were measured according to the method for measuring the cycle characteristics described above. The results are shown in Table 1.

<Measurement of High Rate Characteristics>

The high rate characteristics were measured according to the method for measuring the high rate characteristics described above. The results are shown in Table 1.

Comparative Example 3

A precursor was obtained by heating petroleum pitch having a softening point of 210° C. and H/C atom ratio of 0.63 in the air at 260° C. for 1 hour. 12 g of this precursor was sampled and filled in a quartz tube having an inner diameter of 25 mm. The temperature of this precursor was elevated to 600° C. over 30 minutes in a nitrogen gas flow of 300 Ncc/min under atmospheric pressure, held at 600° C. for 1 hour and the temperature was elevated to 1200° C. over 40 minutes for carbonization to obtain a carbon material. The oxygen concentration in the nitrogen gas used was found to be 1 ppm as a result of measurement using a trace oxygen analyzer (306WA-type, manufactured by Teledyne Analytical Instruments).

<Analysis of Carbon Material>

(Results of CHN Analysis)

In the obtained carbon material, the number ratio of nitrogen atoms to carbon atoms ($N_N/N_C$) was not more than 0.001 (lower than detection limit) and the number ratio of hydrogen atoms to carbon atoms ($N_H/N_C$) was 0.09.

<Pulverization and Classification of Carbon Material>

The obtained carbon material was pulverized and classified to obtain a carbon material having an average particle diameter of about 12 μm and this was used for the preparation of a negative electrode.

<Preparation of Negative Electrode for Lithium Ion Secondary Battery>

A negative electrode for a lithium ion secondary battery was prepared according to the method of preparing a negative electrode for a lithium ion secondary battery described above. The density of the carbon material for the negative electrode was adjusted to 3.6 mg/cm² by the amount of the solvent and the thickness of the doctor blade.

<Preparation of the Lithium Ion Secondary Battery>

A lithium ion secondary battery was prepared according to the method of preparing a lithium ion secondary battery described above.

<Measurement of Discharge Capacity>

The discharge capacity was measured according to the method for measuring the discharge capacity described above. The results are shown in Table 1.

<Measurement of Cycle Characteristics>

The cycle characteristics were measured according to the method for measuring the cycle characteristics described above. The results are shown in Table 1.

<Measurement of High Rate Characteristics>

The high rate characteristics were measured according to the method for measuring the high rate characteristics described above. The results are shown in Table 1.

TABLE 1

| | | Cycle characteristics measured by CC method | | High rate characteristics measured by CC method |
| --- | --- | --- | --- | --- |
| | Discharge capacity measured by CC-CV method[1] (mAh/g) | Discharge capacity at the 5th accumulated cycle (charge/discharge at 0.04 A/g) (mAh/g) | Discharge capacity at the 35th accumulated cycle (charge/discharge at 0.04 A/g) (mAh/g) | Discharge capacity at the 30th accumulated cycle (charge/discharge at 1.2 A/g) (mAh/g) |
| Ex. 1 | 490 | 320 | 320 | 155 |
| Ex. 2 | 490 | 320 | 320 | 152 |
| Ex. 3 | 500 | 330 | 328 | 160 |
| Ex. 4 | 490 | 320 | 320 | 155 |
| Com. Ex. 1 | 365 | 310 | 280 | 20 |
| Com. Ex. 2 | 220 | 170 | 155 | 108 |
| Com. Ex. 3 | 200 | 160 | 160 | 98 |

[1]CC: constant current CV: constant voltage

The results shown in Table 1 indicate that the lithium ion secondary batteries with a negative electrode of the present invention have large discharge capacity. The results of the cycle characteristics shown in Table 1 indicate that the lithium ion secondary batteries with a negative electrode of the present invention are excellent in cycle characteristics in high level even if the lithium ion secondary batteries are loaded heavily.

The results of the high rate characteristics in Table 1 indicate that the lithium ion secondary batteries with a negative electrode of the present invention maintain large capacity even if the charge/discharge at a high rate was carried out. As for the high rate characteristics, it is known that charging is rate-limiting when an discharge was compared with charge, the high rate characteristics here reflects the charge receiving characteristics. Therefore, it was found that the lithium ion secondary batteries with a negative electrode of the present invention are excellent in charge receiving characteristics.

<Electrode for Electric Double Layer Capacitors>

The method of preparing an electrode for an electric double layer capacitor, the method of preparing an electric double layer capacitor and the method for measuring the characteristics of an electric double layer capacitor are as follows.

(Method of Preparing Electrode for Electric Double Layer Capacitor)

The carbon material and polytetrafluoroethylene (binder) were mixed so that carbon material:polytetrafluoroethylene=95:5 (mass ratio) and kneaded in a mortar for 30 minutes. Nickel mesh (100 mesh) was used as a current collector. The obtained kneaded material was placed on a nickel mesh having 12 mmφ and compressed using a press machine at 60 t to obtain an electrode.

The mass of the carbon material and the density of the carbon material were calculated by the following expressions.

(Mass of carbon material)=(mass of electrode)−(mass of current collector)−(mass of binder)

(Density of carbon material)=(mass of carbon material)/(electrode area)

The electrode area was 1.13 cm² here.

(Method for Preparing Electric Double Layer Capacitor)

Two pieces of electrodes prepared by the method of preparing an electrode described above were disposed so that they face oppositely with a separator therebetween to obtain an electric double layer capacitor. An aqueous solution of 7M-KOH was used as an electrolyte. A glass fiber filter paper ("GB100R" (product name) manufactured by Advantec Corporation) was used as a separator.

(Method for Measuring the Characteristics of Electric Double Layer Capacitor)

The cyclic voltammogram measurement was performed at a scanning rate of 1 mV/s, potential range of −0.8 to 0.8V. Constant current charge/discharge measurement was performed at a current density of 100 to 500 mA/g, potential range of 0 to 1.0 V. Single electrode capacitance C was determined by $C = 2 \times I/w \times \Delta t/\Delta V$. Here, l is an current (mA), w is a mass of a carbon material of a single electrode (mg), $\Delta t/\Delta V$ is a slope of discharge curve of the constant current charge/discharge curve (s/V).

Example 5

12 g of the azulmic acid obtained as above was sampled and filled in a quartz tube having an inner diameter of 25 mm. The temperature of this azulmic acid was elevated to 800° C. over 50 minutes in a nitrogen gas flow of 300 Ncc/min under atmospheric pressure, and held at 800° C. for 1 hour for carbonization to obtain 4.4 g of a carbon material (AZC). The yield of AZC for the azulmic acid mentioned above was 37%. The oxygen concentration in the nitrogen gas used was found to be 1 ppm as a result of measurement using a trace oxygen analyzer (306WA-type, manufactured by Teledyne Analytical Instruments).

<Analysis of Carbon Material>

(Results of CHN Analysis)

In the obtained AZC, the number ratio of nitrogen atoms to carbon atoms ($N_N/N_C$) was 0.30 and the number ratio of hydrogen atoms to carbon atoms ($N_H/N_C$) was 0.31.

(Results of Measurement of Laser Raman Spectrum)

The obtained AZC had peaks around 1355 cm⁻¹ (P1) and around 1570 cm⁻¹ (P2) in the range from 1000 to 2000 cm⁻¹ and had a ratio of (L/H1) of 0.85. As a result of peak fitting with a gauss function, the half width of the peak around 1355 cm$^{-1}$ was 302 cm$^{-1}$ and the half width of the peak around 1570 cm$^{-1}$ was 137 cm$^{-1}$.

(Results of Measurement of X-Ray Diffraction)

The obtained AZC had a main peak around 25.0° and also a peak around 44.7° in the range between 5° and 50°.

(Results of Measurement of Specific Surface Area)

The specific surface area of the obtained AZC was 150 m$^2$/g.

(Results of Measurement of Bulk Density)

The bulk density of obtained AZC was 0.75 g/cm$^3$.

<Pulverization and Classification of Carbon Material>

The obtained AZC was pulverized and classified to obtain AZC having an average particle diameter of about 20 μm and this was used for the preparation of an electrode. In the Examples of the present invention, storage, pulverization and storage after pulverization were all performed in the air.

<Preparation of Electrode for Electric Double Layer Capacitor>

An electrode for an electric double layer capacitor was prepared according to the method of preparing an electrode for an electric double layer capacitor described above. The density of the carbon material for the electrode was 23 mg/cm$^2$.

<Measurement of Characteristics of Electric Double Layer Capacitor>

The cyclic voltammogram measurement and constant current charge/discharge measurement were performed according to the method for measuring the characteristics of an electric double layer capacitor mentioned above. The cyclic voltammogram was show in FIG. 3. The capacitance per single electrode was measured from the results of performing constant current charge/discharge measurement at an current of 100 mA/g per unit mass of AZC. The results are shown in Table 2.

Example 6

The azulmic acid obtained as above was heat-treated at 250° C. in the air for 1 hour to obtain 250° C.-heat treatment product.

12 g of the 250° C.-heat treatment product obtained as above was sampled and filled in a quartz tube having an inner diameter of 25 mm. The temperature of this 250° C.-heat treatment product was elevated to 800° C. over 50 minutes in a nitrogen gas flow of 300 Ncc/min under atmospheric pressure, and held at 800° C. for 1 hour for heat-treatment to obtain 5.1 g of a carbon material (AZC). The yield of AZC for the heat treatment product mentioned above was 42%. The oxygen concentration in the nitrogen gas used was found to be 1 ppm as a result of measurement using a trace oxygen analyzer (306WA-type, manufactured by Teledyne Analytical Instruments).

<Analysis of Carbon Material>

(Results of CHN Analysis)

In the obtained AZC, the number ratio of nitrogen atoms to carbon atoms ($N_N/N_C$) was 0.36 and the number ratio of hydrogen atoms to carbon atoms ($N_H/N_C$) was 0.30.

(Results of Measurement of Laser Raman Spectrum)

The obtained AZC had peaks around 1355 cm$^{-1}$ (P1) and around 1570 cm$^{-1}$ (P2) in the range from 1000 to 2000 cm$^{-1}$ and had a ratio of (L/H1) of 0.88. As a result of peak fitting with a gauss function, the half width of the peak around 1355 cm$^{-1}$ was 303 cm$^{-1}$ and the half width of the peak around 1570 cm$^{-1}$ was 138 cm$^{-1}$.

(Results of Measurement of X-Ray Diffraction)

The obtained AZC had a main peak around 25.0° and also a peak around 44.7° in the range between 5° and 50°.

(Results of Measurement of Specific Surface Area)

The specific surface area of the obtained AZC was 180 m$^2$/g.

(Results of Measurement of Bulk Density)

The bulk density of obtained AZC was 0.74 g/cm$^3$.

<Pulverization and Classification of Carbon Material>

The obtained AZC was pulverized and classified to obtain AZC having an average particle diameter of about 20 μm and this was used for the preparation of an electrode.

<Preparation of Electrode for Electric Double Layer Capacitor>

An electrode for an electric double layer capacitor was prepared according to the method of preparing an electrode for an electric double layer capacitor described above. The density of the carbon material for the electrode was 23 mg/cm$^2$.

<Measurement of Characteristics of Electric Double Layer Capacitor>

The constant current charge/discharge measurement was performed according to the method for measuring the characteristics of an electric double layer capacitor mentioned above. The capacitance per single electrode was measured from the results of performing constant current charge/discharge measurement at an current of 100 mA/g per unit mass of AZC. The results are shown in Table 2.

Comparative Example 4

Palm husk charcoal ("YP-17D" (product name) manufactured by Kuraray Chemical Co., Ltd., average particle diameter: 6 μm) was used as a carbon material.

<Analysis of Carbon Material>

(Results of CHN Analysis)

In the carbon material, the number ratio of nitrogen atoms to carbon atoms ($N_N/N_C$) was 0.001 and the number ratio of hydrogen atoms to carbon atoms ($N_H/N_C$) was 0.14.

(Results of Measurement of Laser Raman Spectrum)

The carbon material had peaks around 1350 cm$^{-1}$ and around 1606 cm$^{-1}$ in the range from 1000 to 2000 cm$^{-1}$ and had a ratio of (L/H1) of 0.24. As a result of peak fitting with a gauss function, the half width of the peak around 1350 cm$^{-1}$ was 115 cm$^{-1}$ and the half width of the peak around 1606 cm$^{-1}$ was 60 cm$^{-1}$.

(Results of Measurement of Specific Surface Area)

The specific surface area of the carbon material was 1800 m$^2$/g.

(Results of Measurement of Bulk Density)

The bulk density of the carbon materials was 0.30 g/cm$^3$.

<Preparation of Electrode for Electric Double Layer Capacitor>

An electrode for an electric double layer capacitor was prepared according to the method of preparing an electrode for an electric double layer capacitor described above. The density of the carbon material for the electrode was 23 mg/cm$^2$.

<Measurement of Characteristics of Electric Double Layer Capacitor>

The constant current charge/discharge measurement was performed according to the method for measuring the characteristics of an electric double layer capacitor mentioned above. The capacitance per single electrode was measured from the results of performing constant current charge/discharge measurement at an current of 100 mA/g per unit mass of the carbon material. The results are shown in Table 2.

TABLE 2

| | Capacitance per surface area (F/m$^2$) | Capacitance per volume (F/cm$^3$) |
|---|---|---|
| Ex. 5 | 0.81 | 91 |
| Ex. 6 | 1.12 | 148 |
| Com. Ex. 4 | 0.11 | 60 |

These results show that the electric double layer capacitor with an electrode of the present invention has a large capacitance per surface area and a large capacitance per volume.

Figure 3:
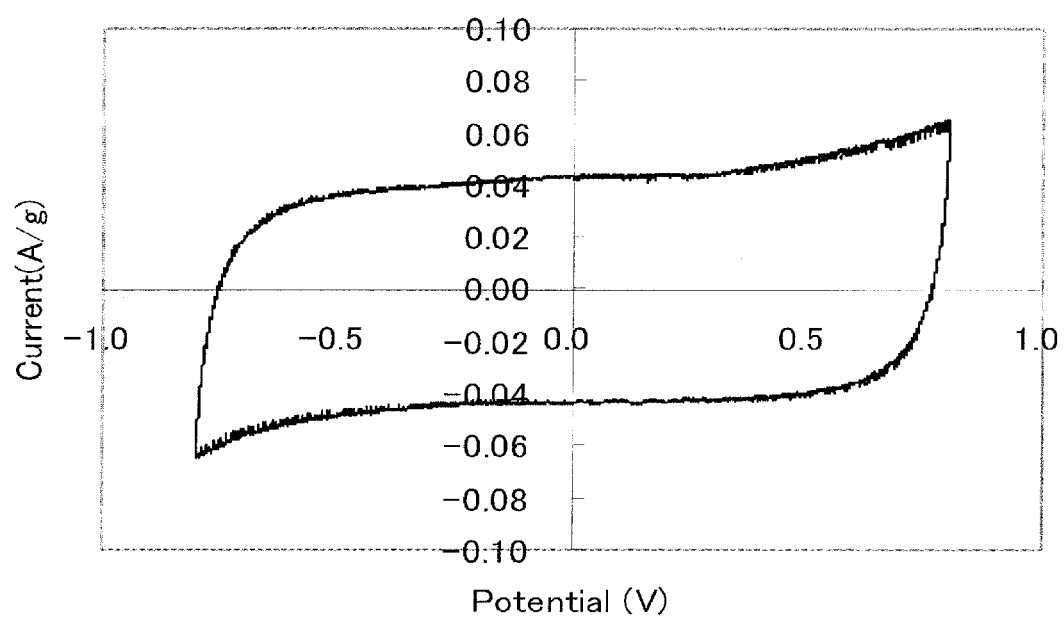
FIG. 3 illustrates a cyclic voltammogram of an electric double layer capacitor obtained by Example 5.

In addition, the electric double layer capacitor of this embodiment shows a cyclic voltammogram in a good rectangle form as can be seen from FIG. 3 thus revealing that it has an ideal capacitor behavior. From these results, it was confirmed that the electric double layer capacitors of the present invention are ideal capacitors with a good balance in the capacitance and the behavior.

[Electrode for Fuel Cell]

The preparation process of a supported catalyst, the preparation process of an electrode for a fuel cell and the method for electrochemical measurement of the fuel cell are as follows.

<Preparation of Supported Catalyst>

4 g of cobalt phthalocyanine complex was dissolved in 100 g of concentrated sulfuric acid to obtain a solution. 1.5 g of a carbon material was added to this solution and stirred for 1 hour. Then the solution was divided by filtration, and the residue (solid content) was obtained. The temperature of the obtained residue was elevated to 800° C. over 50 minutes in a nitrogen gas flow of 300 Ncc/min under atmospheric pressure, and further held at 800° C. for 1 hour for carbonization to obtain a supported catalyst.

<Method of Preparing Electrode for Fuel Cell>

A 50 mass % ethanol aqueous solution was added to 0.1 g of the supported catalyst obtained as above and the whole amount was adjusted to 100 g. Supersonic wave was applied thereto to obtain a 0.1% catalyst suspension. 100 µL of this catalyst suspension was sampled and applied on a glassy carbon electrode (diameter: 6 mm) as a current collector and dried at 80° C. to obtain a dried product. Then, 100 µL of a proton conductive solution (Nafion, an ethanol solution of 0.15% content) was dropped onto the dried product mentioned above and dried at 120° C. for 2 hours in a nitrogen atmosphere to prepare an electrode.

<Method for Electrochemically Measuring Fuel Cell>

The obtained electrode was subjected to an electrochemical test at 25° C. using a 3 electrode-type electrochemistry cell in 0.5 M aqueous solution of sulfuric acid which was saturated with an oxygen gas by bubbling an oxygen gas for 30 minutes. The obtained electrode, Pt and Ag/AgCl were used as a working electrode, a counter electrode and a reference electrode, respectively and the current, swept at 0.5 mV/s was measured.

Example 7

12 g of the azulmic acid obtained as above was sampled and filled in a quartz tube having an inner diameter of 25 mm. The temperature of this azulmic acid was elevated to 800° C. over 50 minutes in a nitrogen gas flow of 300 Ncc/min under atmospheric pressure, and held at 800° C. for 1 hour for carbonization to obtain a carbon material (AZC). This operation was repeated 5 times to obtain 5 lots, which were mixed and used for the following experiments.

<Analysis of Carbon Material>
(Results of CHN Analysis)

In the obtained AZC, the number ratio of nitrogen atoms to carbon atoms ($N_N/N_C$) was 0.30 and the number ratio of hydrogen atoms to carbon atoms ($N_H/N_C$) was 0.31.

(Results of Measurement of Laser Raman Spectrum)

The obtained AZC had peaks around 1355 cm$^{-1}$ (P1) and around 1570 cm$^{-1}$ (P2) in the range from 1000 to 2000 cm$^{-1}$ and had a ratio of (L/H1) of 0.85. As a result of peak fitting with a gauss function, the half width of the peak around 1355 cm$^{-1}$ was 302 cm$^{-1}$ and the half width of the peak around 1570 cm$^{-1}$ was 137 cm$^{-1}$.

(Results of Measurement of X-Ray Diffraction)

The obtained AZC had a main peak around 25.0° and also a peak around 44.7° in the range between 5° and 50°.

<Pulverization and Classification of Carbon Material>

The obtained AZC was pulverized and classified to obtain AZC having an average particle diameter of about 20 µm and this was used for the preparation of a supported catalyst.

<Preparation of Supported Catalyst>

A supported catalyst was prepared using the obtained AZC carbon material according to the method of preparing a supported catalyst mentioned above.

<Preparation of Electrode of Fuel Cell>

An electrode for a fuel cell was prepared according to the method of preparing an electrode for a fuel cell described above.

<Electrochemical Measurement of Fuel Cell>

Measurement was performed according to the method for electrochemically measuring the fuel cell mentioned above. The current when the potential was 0.4 V is shown in Table 3.

Comparative Example 5

12 g of petroleum pitch having a softening point of 210° C. and H/C atom ratio of 0.63 was filled in a quartz tube having an inner diameter of 25 mm. The temperature of this petroleum pitch was elevated to 1000° C. over 70 minutes in a nitrogen gas flow of 300 Ncc/min under atmospheric pressure, and further held at 800° C. for 1 hour for carbonization to obtain a carbon material. This operation was repeated 5 times to obtain 5 lots, which were mixed and used for the following experiments.

<Analysis of Carbon Material>
(Results of CHN Analysis)

In the obtained carbon material, the number ratio of nitrogen atoms to carbon atoms ($N_N/N_C$) was not more than 0.001.

<Pulverization and Classification of Carbon Material>

The obtained carbon material was pulverized and classified to obtain a carbon material having an average particle diameter of about 20 µm and this was used for the preparation of a supported catalyst.

<Preparation of Supported Catalyst>

A supported catalyst was prepared using the obtained carbon material according to the method of preparing the supported catalyst mentioned above.

<Preparation of Electrode of Fuel Cell>

An electrode for a fuel cell was prepared according to the method of preparing an electrode for a fuel cell described above.

<Electrochemical Measurement of Fuel Cell>

Measurement was performed according to the method for electrochemically measuring the fuel cell mentioned above. The current when the potential was 0.4 V is shown in Table 3.

Comparative Example 6

A carbon material was obtained in the same way as in Comparative Example 5 except that a mixture of 6 g of the petroleum pitch mentioned above and 6 g of melamine in substitution for 12 g of the petroleum pitch.
<Analysis of Carbon Material>
(Results of CHN Analysis)
In the obtained carbon material, the number ratio of nitrogen atoms to carbon atoms ($N_N/N_C$) was 0.01 and the number ratio of hydrogen atoms to carbon atoms ($N_H/N_C$) was 0.34.
<Pulverization and Classification of Carbon Material>
The obtained carbon material was pulverized and classified to obtain a carbon material having an average particle diameter of about 20 μm and this was used for the preparation of a supported catalyst.
<Preparation of Supported Catalyst>
A supported catalyst was prepared using the obtained carbon material according to the method of preparing the supported catalyst mentioned above.
<Preparation of Electrode of Fuel Cell>
An electrode for a fuel cell was prepared according to the method of preparing an electrode for a fuel cell described above.
<Electrochemical Measurement of Fuel Cell>
Measurement was performed according to the method for electrochemically measuring the fuel cell mentioned above. The current when the potential was 0.4 V is shown in Table 3.
In Comparative Example 7 described below, a nitrogen-containing carbon material was obtained by heat-treating a melamine resin which is a resin having the largest nitrogen content among the conventional precursors of the nitrogen-containing carbon materials.

Comparative Example 7

252 g of melamine and 650 mL of 37% formaldehyde aqueous solution were mixed, and a small amount of 6 mol/L potassium hydroxide aqueous solution was added thereto while the mixture was stirred to obtain a reaction liquid of pH 8 to 9. The reaction liquid was stirred at 80° C. while refluxing to perform polymerization for 50 hours. During this process, a potassium hydroxide aqueous solution was appropriately added to the reaction liquid to keep the pH in the range of 8 to 9. Heating of the reaction liquid was stopped 50 hours later and the reaction liquid was allowed to cool. Furthermore, 1,500 g of water were added thereto to allow a viscous resin to separate, which was taken out of the reaction liquid and vacuum dried at 80° C. to obtain a melamine resin.
A carbon material was obtained in the same manner as in Example 7 except that the obtained melamine resin was used.
<Analysis of Carbon Material>
(Results of CHN Analysis)
In the obtained carbon material, the number ratio of nitrogen atoms to carbon atoms ($N_N/N_C$) was 0.22 and the number ratio of hydrogen atoms to carbon atoms ($N_H/N_C$) was 0.33.
<Pulverization and Classification of Carbon Material>
The obtained carbon material was pulverized and classified to obtain a carbon material having an average particle diameter of about 20 μm and this was used for the preparation of a supported catalyst.
<Preparation of Supported Catalyst>
A supported catalyst was prepared using the obtained carbon material according to the method of preparing the supported catalyst mentioned above.
<Preparation of Electrode of Fuel Cell>
An electrode for a fuel cell was prepared according to the method of preparing an electrode for a fuel cell described above.
<Electrochemical Measurement of Fuel Cell>
Measurement was performed according to the method for electrochemically measuring the fuel cell mentioned above. The current when the potential was 0.4 V is shown in Table 3.

TABLE 3

| | Carbon raw materials | ($N_N/N_C$) | ($N_H/N_C$) | 0.87 * ($N_H/N_C$) − 0.06 | Current density (mA/cm²) |
|---|---|---|---|---|---|
| Ex. 7 | Azulmic acid | 0.30 | 0.31 | 0.21 | 2.0 |
| Com. Ex. 5 | Petroleum pitch | 0.00 | 0.33 | 0.22 | 0.0 |
| Com. Ex. 6 | Petroleum pitch and melamine | 0.01 | 0.34 | 0.24 | 0.1 |
| Com. Ex. 7 | Melamine resin | 0.22 | 0.33 | 0.23 | 1.0 |

The current corresponds to the reaction rate in the electrochemical field. It can be understood that the fuel cell with an electrode of the present invention has a high oxygen reduction activity.

Industrial Applicability

The electrode for a lithium ion secondary battery and the lithium ion secondary battery according to the present invention are excellent in high charge/discharge capacity, high rate characteristics and cycle characteristics. Besides, the electrode is an electrode for a lithium ion secondary battery having good balance of these battery characteristics and storage stability. In addition, since the high rate characteristics are maintained even if the active materials are thickly applied to the electrode, they are extremely advantageous in capacity as a battery and high rate characteristics.

Furthermore, the carbon materials to be used in the present invention, which are obtained from an azulmic acid, keep the performance mentioned above even when they are stored and/or pulverized in the air and are advantageous for the production process of an electrode for a lithium ion secondary battery and a lithium ion secondary battery using the electrode.

It can be appreciated that the electrode for an electric double layer capacitor and an electric double layer capacitor according to the present invention have a large capacitance per surface area as well as a large capacitance per volume.

In addition, the form of the cyclic voltammogram shows a very good rectangle as can be seen from FIG. 3 and it can be appreciated as an ideal capacitor behavior. The electric double layer capacitors of the present invention are ideal capacitors with a good balance in the capacitance and the behavior.

The electric double layer capacitors of the present invention can be preferably used in the application to battery vehicles or hybrid vehicles, memory backup power supply for portable terminals or PC's, power supply for instantaneous power failure, and energy storage systems such as wind-generated electricity or the solar batteries.

The electrode for a fuel cell and the fuel cell of the present invention are useful as an electrode of a fuel cell and a fuel cell having a high oxygen reduction activity.

In addition, the carbon materials of the electrode of the present invention are polymers obtained from hydrogen cyanide which is directly produced from basic chemical raw materials such as natural gas and propylene and since these carbon materials are produced by heat-treating these raw materials, they can be obtained in high yield with few numbers of steps. Thus, the electrodes of the present invention such as electrodes for lithium secondary batteries, electrodes for electric double layer capacitors and electrodes for fuel cells can be produced efficiently at low cost, and therefore production processes of these electrodes and various types of batteries comprising such electrodes (for example, lithium ion secondary batteries, electric double layer capacitors and fuel cells) are production processes which can save resources and energy and accordingly they are extremely useful.

The invention claimed is:

1. An electrode for a lithium ion secondary battery comprising a carbon material which satisfies the following conditions (1), (2) and (3):
   (1) carbon atoms, nitrogen atoms and hydrogen atoms contained in said electrode satisfy the following expressions (I) and (II):

$(N_N/N_c) > 0.87 \times (N_H/N_c) - 0.06$ (I)

$(N_N/N_c) > 0.01$ (II)

wherein $N_N$, $N_c$ and $N_H$ represent the number of nitrogen atoms, carbon atoms and hydrogen atoms, respectively;
   (2) X-ray diffraction patterns obtained by using a CuKα ray as an X-ray source have a peak at a position corresponding to a diffraction angle (2θ) of 23.5 to 25.5° ; and
   (3) a spectrogram by laser Raman spectrometry with a wave number of 1000 to 2000cm$^{-1}$ has a peak P1 between 1355 and 1385 cm$^{-1}$ and a peak P2 between 1550 and 1620 cm$^{-1}$; a lowest point M having a smallest height L from the baseline between the peak P1 and the peak P2; and a ratio (L/H1) of said height L to a height H1 of 0.70 to 0.95 wherein the height H1 is a height from the baseline at said peak P1.

2. The electrode for a lithium ion secondary battery according to claim 1, comprising a current collector and/or a binder.

3. The electrode for a lithium ion secondary battery according to claim 1, wherein said carbon material is obtained from an azulmic acid.

4. A process of producing an electrode for a lithium ion secondary battery comprising the step of obtaining a carbon material by carbonizing azulmic acid which satisfies the following conditions (1), (2) and (3):
   (1) carbon atoms, nitrogen atoms and hydrogen atoms contained in said electrode satisfy the following expressions (I) and (II):

$(N_N/N_c) > 0.87 \times (N_H/N_c) - 0.06$ (I)

$(N_N/N_c) > 0.01$ (II)

wherein $N_N$, $N_c$ and $N_H$ represent the number of nitrogen atoms, carbon atoms and hydrogen atoms, respectively;
   (2) X-ray diffraction patterns obtained by using a CuKα ray as an X-ray source have a peak at a position corresponding to a diffraction angle (2θ) of 23.5 to 25° ; and
   (3) a spectrogram by laser Raman spectrometry with a wave number of 1000 to 2000 cm$^{-1}$ has a peak P1 between 1355 and 1385 cm$^{-1}$ and a peak P2 between 1550 and 1620 cm$^{-1}$; a lowest point M having a smallest height L from the baseline between the peak P1 and the peak P2; and a ratio (L/H1) of said height L to a height H1 of 0.70 to 0.95 wherein the height H1 is a height from the baseline at said peak P1.

5. A lithium ion secondary battery comprising an electrode for a lithium ion secondary battery according to claim 1.

6. A process of producing a lithium ion secondary battery according to claim 5, comprising the step of obtaining an electrode for a lithium ion secondary battery by a process according to claim 4.

7. An electrode for an electric double layer capacitor comprising a carbon material which satisfies the following conditions (1), (2) and (3):
   (1) carbon atoms, nitrogen atoms and hydrogen atoms contained in said electrode satisfy the following expressions (I) and (II):

$(N_N/N_c) > 0.87 \times (N_H/N_c) - 0.06$ (I)

$(N_N/N_c) > 0.01$ (II)

wherein $N_N$, $N_c$ and $N_H$ represent the number of nitrogen atoms, carbon atoms and hydrogen atoms, respectively;
   (2) X-ray diffraction patterns obtained by using a CuKα ray as an X-ray source have a peak at a position corresponding to a diffraction angle (2θ) of 23.5 to 25.5° ; and
   (3) a spectrogram by laser Raman spectrometry with a wave number of 1000 to 2000cm$^{-1}$ has a peak P1 between 1355 and 1385 cm$^{-1}$ and a peak P2 between 1550 and 1620 cm$^{-1}$; a lowest point M having a smallest height L from the baseline between the peak P1 and the peak P2; and a ratio (L/H1) of said height L to a height H1 of 0.70 to 0.95 wherein the height H1 is a height from the baseline at said peak P1.

8. The electrode for an electric double layer capacitor according to claim 7, comprising a current collector and/or a binder.

9. The electrode for an electric double layer capacitor according to claim 7, wherein said carbon material is obtained from an azulmic acid.

10. A process of producing an electrode for an electric double layer capacitor comprising the step of obtaining a carbon material by carbonizing azulmic acid which satisfies the following conditions (1), (2) and (3):
    (1) carbon atoms, nitrogen atoms and hydrogen atoms contained in said electrode satisfy the following expressions (I) and (II):

$(N_N/N_c) > 0.87 \times (N_H/N_c) - 0.06$ (I)

$(N_N/N_c) > 0.01$ (II)

wherein $N_N$, $N_c$ and $N_H$ represent the number of nitrogen atoms, carbon atoms and hydrogen atoms, respectively;
    (2) X-ray diffraction patterns obtained by using a CuKα ray as an X-ray source have a peak at a position corresponding to a diffraction angle (2θ) of 23.5to 25.5° ; and
    (3) a spectrogram by laser Raman spectrometry with a wave number of 1000 to 2000 cm$^{-1}$ has a peak P1 between 1355 and 1385 cm$^{-1}$ and a peak P2 between 1550 and 1620 cm$^{-1}$; a lowest point M having a smallest height L from the baseline between the peak P1 and the peak P2; and a ratio (L/H1) of said height L to a height H1 of 0.70 to 0.95 wherein the height H1 is a height from the baseline at said peak P1.

11. An electric double layer capacitor comprising an electrode for an electric double layer capacitor according to claim 7.

12. A process of producing an electric double layer capacitor according to claim 11, comprising the step of obtaining an electrode for an electric double layer capacitor by a process according to claim 10.

13. An electrode for fuel cells comprising a carbon material which satisfies the following conditions (1), (2) and (3):
    (1) carbon atoms, nitrogen atoms and hydrogen atoms contained in said electrode satisfy the following expressions (I) and (II):

$(N_N/N_c) > 0.87 \times (N_H/N_c) - 0.06$ (I)

$(N_N/N_c) > 0.01$ (II)

wherein $N_N$, $N_C$ and $N_H$ represent the number of nitrogen atoms, carbon atoms and hydrogen atoms, respectively;

(2) X-ray diffraction patterns obtained by using a CuKα ray as an X-ray source have a peak at a position corresponding to a diffraction angle (2θ) of 23.5 to 25.5°; and (3) a spectrogram by laser Raman spectrometry with a wave number of 1000 to 2000cm$^{-1}$ has a peak P1 between 1355 and 1385 cm$^{-1}$ and a peak P2 between 1550 and 1620 cm$^{-1}$; a lowest point M having a smallest height L from the baseline between the peak P1 and the peak P2; and a ratio (L/H1) of said height L to a height H1 of 0.70 to 0.95 wherein the height H1 is a height from the baseline at said peak P1.

14. The electrode for a fuel cell according to claim 13, comprising a current collector and/or a binder.

15. The electrode for a fuel cell according to claim 13, wherein said carbon material is obtained from an azulmic acid.

16. A process of producing an electrode for a fuel cell comprising the step of obtaining a carbon material by carbonizing azulmic acid which satisfies the following conditions (1), (2) and (3):

(1) carbon atoms, nitrogen atoms and hydrogen atoms contained in said electrode satisfy the following expressions (I) and (II):

$$(N_N/N_c) > 0.87 \times (N_H/N_c) - 0.06 \quad \text{(I)}$$

$$(N_N/N_c) > 0.01 \quad \text{(II)}$$

wherein $N_N$, $N_C$ and $N_H$ represent the number of nitrogen atoms, carbon atoms and hydrogen atoms, respectively;

(2) X-ray diffraction patterns obtained by using a CuKα ray as an X-ray source have a peak at a position corresponding to a diffraction angle (2θ) of 23.5 to 25.5°; and (3) a spectrogram by laser Raman spectrometry with a wave number of 1000 to 2000 cm$^{-1}$ has a peak P1 between 1355 and 1385 cm$^{-1}$ and a peak P2 between 1550 and 1620 cm$^{-1}$; a lowest point M having a smallest height L from the baseline between the peak P1 and the peak P2; and a ratio (L/H1) of said height L to a height H1 of 0.70 to 0.95 wherein the height H1 is a height from the baseline at said peak P1.

17. A fuel cell comprising an electrode for a fuel cell according to claim 13.

18. A process of producing the fuel cell according to claim 17 comprising the step of obtaining an electrode for the fuel cell by a process according to claim 16.

\* \* \* \* \*